United States Patent
Wu

(10) Patent No.: US 11,356,250 B2
(45) Date of Patent: Jun. 7, 2022

(54) KEY DATA PROCESSING

(71) Applicant: Advanced New Technologies Co., Ltd., George Town (KY)

(72) Inventor: Hao Wu, Chengdu (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/351,123

(22) Filed: Jun. 17, 2021

(65) Prior Publication Data
US 2021/0314147 A1    Oct. 7, 2021

Related U.S. Application Data

(63) Continuation of application No. 17/063,126, filed on Oct. 5, 2020, now Pat. No. 11,095,437, which is a (Continued)

(30) Foreign Application Priority Data

Aug. 28, 2017 (CN) .......................... 201710747807.5

(51) Int. Cl.
*H04L 9/08* (2006.01)
*H04L 9/14* (2006.01)
(Continued)

(52) U.S. Cl.
CPC ........ *H04L 9/0819* (2013.01); *G06F 9/30029* (2013.01); *G06Q 20/367* (2013.01);
(Continued)

(58) Field of Classification Search
CPC ....... H04L 9/0819; H04L 9/083; H04L 9/085; H04L 9/14; H04L 9/0869; H04L 9/0637;
(Continued)

(56) References Cited

U.S. PATENT DOCUMENTS 5,850,451 A    12/1998   Sudia
6,411,716 B1    6/2002   Brickell
(Continued)

FOREIGN PATENT DOCUMENTS

CN            1601957         3/2005
CN            1697372        11/2005
(Continued)

OTHER PUBLICATIONS

Fan, Yunsong et al. Translation of Document No. CN 100531032, Aug. 2009. (Year: 2009).*
(Continued)

*Primary Examiner* — Michael Simitoski
(74) *Attorney, Agent, or Firm* — Fish & Richardson P.C.

(57) ABSTRACT

A parent cryptographic key associated with a blockchain object is obtained. A number of parties (N) to share control over the blockchain object is obtained. N child cryptographic keys are generated based on the parent cryptographic key by applying a predetermined algorithm to the parent cryptographic key, wherein N is an integer greater than or equal to 2, and wherein the N child cryptographic keys are collectively configured to enable reconstruction of the parent cryptographic key.

15 Claims, 13 Drawing Sheets

Related U.S. Application Data continuation of application No. 16/719,762, filed on Dec. 18, 2019, now Pat. No. 10,797,865, which is a continuation of application No. 16/113,722, filed on Aug. 27, 2018, now Pat. No. 10,873,449.

(51) Int. Cl.
| | | |
|---|---|---|
| *H04L 9/06* | (2006.01) | |
| *G06F 9/30* | (2018.01) | |
| *G06Q 20/36* | (2012.01) | |
| *G06Q 20/38* | (2012.01) | |

(52) U.S. Cl.
CPC ....... *G06Q 20/3829* (2013.01); *H04L 9/0637* (2013.01); *H04L 9/083* (2013.01); *H04L 9/085* (2013.01); *H04L 9/0869* (2013.01); *H04L 9/14* (2013.01); *H04L 2209/24* (2013.01); *H04L 2209/38* (2013.01)

(58) Field of Classification Search
CPC ............... H04L 9/0825; H04L 2209/24; G06F 9/30029; G06Q 20/367; G06Q 20/3829; G06Q 20/401
See application file for complete search history.

(56) References Cited

U.S. PATENT DOCUMENTS

| | | | |
|---|---|---|---|
| 8,068,606 | B2 | 11/2011 | Schneider |
| 9,514,326 | B1 | 12/2016 | Kroeger |
| 9,667,416 | B1* | 5/2017 | Machani ................ H04L 63/06 |
| 10,423,961 | B1 | 9/2019 | Defrawy et al. |
| 10,601,585 | B1* | 3/2020 | Robinson ............. H04L 9/0894 |
| 10,797,865 | B2 | 10/2020 | Wu |
| 10,873,449 | B2 | 12/2020 | Wu |
| 2006/0010324 | A1 | 1/2006 | Appenzeller et al. |
| 2006/0177061 | A1 | 8/2006 | Orsini et al. |
| 2007/0223706 | A1 | 9/2007 | Gantman et al. |
| 2009/0077379 | A1 | 3/2009 | Geyzel et al. |
| 2009/0290707 | A1 | 11/2009 | Schneider |
| 2010/0299313 | A1 | 11/2010 | Orsini et al. |
| 2011/0286594 | A1 | 11/2011 | Resch et al. |
| 2012/0072723 | A1 | 3/2012 | Orsini et al. |
| 2012/0243687 | A1 | 9/2012 | Li et al. |
| 2014/0195809 | A1 | 7/2014 | Solow et al. |
| 2014/0310516 | A1 | 10/2014 | O'Hare et al. |
| 2015/0262171 | A1* | 9/2015 | Langschaedel .... G06Q 20/3825 705/71 |
| 2015/0304103 | A1 | 10/2015 | Rebikov et al. |
| 2016/0212109 | A1 | 7/2016 | Hird |
| 2016/0226846 | A1 | 8/2016 | Fu et al. |
| 2016/0269182 | A1 | 9/2016 | Sriram et al. |
| 2017/0104745 | A1* | 4/2017 | Camenisch ............. H04L 9/085 |
| 2018/0367298 | A1 | 12/2018 | Wright |
| 2020/0127817 | A1 | 4/2020 | Wu |
| 2020/0136814 | A1 | 4/2020 | Wu |
| 2020/0213085 | A1* | 7/2020 | Fletcher ................ H04L 9/3255 |
| 2020/0213125 | A1* | 7/2020 | Destefanis ............ H04L 9/3297 |
| 2021/0021409 | A1 | 1/2021 | Wu |
| 2021/0090072 | A1* | 3/2021 | Sewell .................. G06Q 20/065 |
| 2021/0184855 | A1* | 6/2021 | Joseph ............... G06Q 20/3676 |

FOREIGN PATENT DOCUMENTS

| | | |
|---|---|---|
| CN | 1953368 | 4/2007 |
| CN | 100531032 | 8/2009 |
| CN | 102946310 | 2/2013 |
| CN | 103840946 A | 6/2014 |
| CN | 104022869 | 9/2014 |
| CN | 104579644 | 4/2015 |
| CN | 105723647 | 6/2016 |
| CN | 106027234 | 10/2016 |
| CN | 106027245 | 10/2016 |
| EP | 1052611 | 11/2000 |
| JP | 2001236259 | 8/2001 |
| JP | 2004032307 | 1/2004 |
| JP | 2004171148 | 6/2004 |
| TW | 526643 | 4/2003 |
| WO | WO 2010147215 | 12/2010 |

OTHER PUBLICATIONS

Goldfeder, Steven, et al. "Securing Bitcoin wallets via a new DSA/ECDSA threshold signature scheme." et al . . . 2015. (Year: 2015).*

Sun, Yi et al. (Huawei Tech) CN 100531032 C, published 2009 (machine translation). (Year: 2009).*

Extended European Search Report in Europe Application No. 21173066.8, dated Jul. 28, 2021, 8 pages.

Crosby et al., "BlockChain Technology: Beyond Bitcoin," Sutardja Center for Entrepreneurship & Technology Technical Report, Oct. 16, 2015, 35 pages.

Kirihara et al.," A New (k, n)—Threshold Secret Sharing Scheme and Its Extension", International Conference on Information Security. Springer, Berlin, Heidelberg, 2008, 18 pages.

Nakamoto, "Bitcoin: A Peer-to-Peer Electronic Cash System," www.bitcoin.org, 2005, 9 pages.

PCT International Preliminary Report on Patentability in International Application No. PCT/US2018/048370, dated Jul. 24, 2019, 7 pages.

PCT International Search Report and Written Opinion in International Application No. PCT/US2018/048370, dated Nov. 19, 2018, 14 pages.

T. Alexandrova, Y. Suzuki, K. Okubo and N. Tagawa, "Secret images sharing scheme using two-variable one-way functions," 2010 IEEE International Conference on Wireless Communications, Networking and Information Security, Beijing, China, 2010, pp. 553-557, doi: 10.1109/VVCINS.2010.5541840. (Year: 2010).

Wikipedia.com [online], "Secret Sharing", 2010, retrieved on Feb. 25, 2020, retrieved from URL<https://web.archive.org/web/20100610171227/https://en.wikipedia/org/wiki/Secret_sharing>, 5 pages.

Wikipedia.org. "Shannir's Secret Sharing" entry. Date unavailable; accessed 2021. (Year: 2021).

Zhou et al., "Distributed Bitcoin Account Management," 2016 IEEE Trustcom/Bigdatase/ISPA, 2016, 105-112.

Antonopoulos, Mastering Bitcoin: Unlocking Digital Cryptocurrencies, 1st edition, NTT Publishing (JP), Jul. 2016, Chapter 10 (English equivalent copy included).

* cited by examiner

KEY DATA PROCESSING

CROSS REFERENCE TO RELATED APPLICATION

This application is a continuation of U.S. patent application Ser. No. 17/063,126, filed Oct. 5, 2020, which is a continuation U.S. patent application Ser. No. 16/719,762, filed Dec. 18, 2019, now U.S. Pat. No. 10,797,865, which is a continuation of U.S. patent application Ser. No. 16/113,722, filed Aug. 27, 2018, now U.S. Pat. No. 10,873,449, which claims priority to Chinese Patent Application No. 201710747807.5, filed on Aug. 28, 2017, and each application is hereby incorporated by reference in its entirety.

TECHNICAL FIELD

Implementations of the present specification relate to the field of blockchain data processing technologies, and in particular, to a key data processing method and apparatus, and a server.

BACKGROUND

A blockchain is a distributed database. It is a chained data structure obtained by combining data blocks in chronological order. Cryptographic method is used to ensure that data cannot be tampered with or forged. Because the blockchain can effectively ensure data authenticity, it is applied in more fields.

Generally, the data in the blockchain is signed and verified by using an asymmetric encryption method. A transaction initiator in the blockchain can sign a transaction by using a private key, and a miner (a computing node) can verify the transaction by using a public key of the initiator. If verification on the transaction succeeds, it can indicate that funds used for the transaction belong to a normal asset owner, and information about the transaction is placed in a new block of the blockchain. In an asset transaction process of the blockchain, a private key is usually owned by a single party, for example, stored in a person's mobile phone or computer. Therefore, it can be considered that ownership and control rights of the assets belong to the party owning the private key. However, some assets in reality are shared by a plurality of persons, for example, real estate jointly owned by a couple, or a joint venture investment. When assets need to be shared by a plurality of parties, the parties need to share the same private key. By using the private key, each sharing party can control and trade the assets, and can transfer the assets in the absence of the other people's knowledge. Consequently, there is a relatively high transaction risk. Therefore, a securer and more reliable method for ensuring security of shared assets in the blockchain is urgently needed.

SUMMARY

Implementations of the present specification are intended to provide a key data processing method and apparatus, and a server. As such, the same number of child keys based on the number of asset sharing parties can be automatically generated, and an original key can be restored by using the child keys during a transaction, effectively ensuring security of asset sharing in a blockchain.

The key data processing method and apparatus, and the server provided in the implementations of the present specification are implemented in the following ways:

A key data processing method includes: obtaining an original key of a shared object in a blockchain, and determining the number of parties sharing the original key; and processing the original key by using a predetermined algorithm, to generate the same number of child keys as that of parties sharing the original key, where the child keys are used to restore the original key when the same number of child keys are obtained.

A key data processing apparatus includes: an original key information acquisition module, configured to obtain an original key of a shared object in a blockchain, and determine the number of parties sharing the original key; and a child key generation module, configured to process the original key by using a predetermined algorithm, to generate the same number of child keys as that of parties sharing the original key, where the child keys are used to restore the original key when the same number of child keys are obtained.

A key data processing apparatus, including a processor and a memory configured to store an instruction that can be executed by the processor, where when executing the instruction, the processor implements the following operations: obtaining an original key of a shared object in a blockchain, and determining the number of parties sharing the original key; and processing the original key by using a predetermined algorithm, to generate the same number of child keys as that of parties sharing the original key, where the child keys are used to restore the original key when the same number of child keys are obtained.

A server, including at least one processor and a memory configured to store an instruction that can be executed by the processor, where when executing the instruction, the processor implements the following operations: obtaining an original key of a shared object in a blockchain, and determining the number of parties sharing the original key; and processing the original key by using a predetermined algorithm, to generate the same number of child keys as that of parties sharing the original key, where the child keys are used to restore the original key when the same number of child keys are obtained.

According to the key data processing method and apparatus, and the server provided in the one or more implementations of the present specification, the original key can be split into the plurality of child keys based on the number of parties sharing the original key of the shared object, such as assets or data, and the generated child keys can be displayed to the corresponding asset sharing parties. When the shared object needs to be operated, each asset sharing party can provide a child key. Then the original key can be restored by using the child keys, and corresponding operations such as signing and asset transactions can be performed. As such, in the implementations of the present specification, when assets in the blockchain are shared by a plurality of persons, any person can be effectively prevented from operating the assets in the absence of the other people's knowledge, so as to ensure security of a shared asset transaction in the blockchain.

BRIEF DESCRIPTION OF DRAWINGS

To describe the technical solutions in the implementations of the present specification or in the existing technology more clearly, the following briefly introduces the accompanying drawings for describing the implementations or the existing technology. Apparently, the accompanying drawings in the following description merely show some implementations of the present specification, and a person of ordinary skill in the art can still derive other drawings from these accompanying drawings without creative efforts.

DESCRIPTION OF IMPLEMENTATIONS

Figure 1:
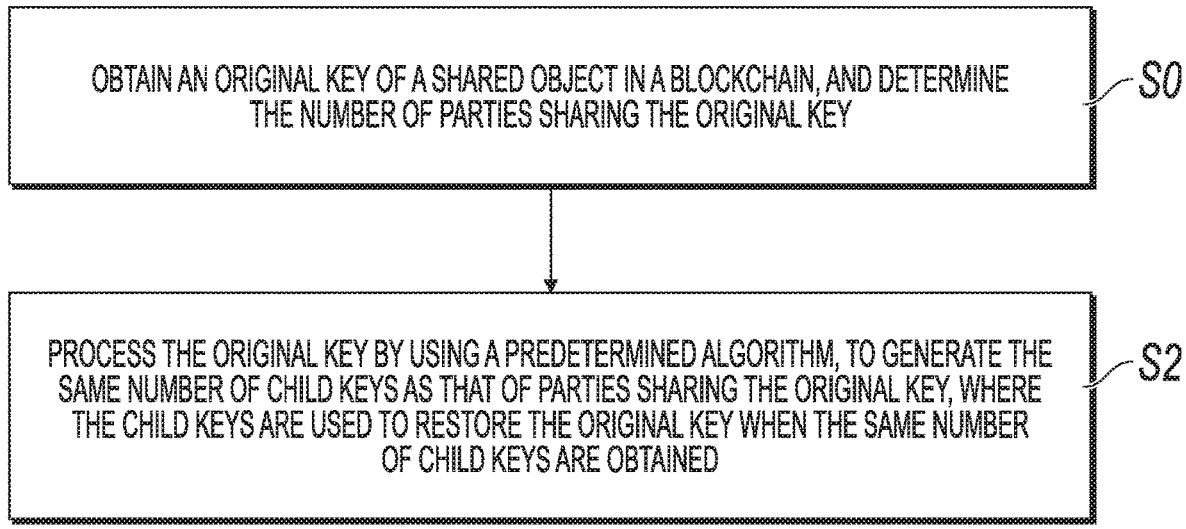
FIG. 1 is a flow diagram illustrating an example method for key data processing, according to the present specification.

To make a person skilled in the art understand the technical solutions in the present specification better, the following clearly and comprehensively describes the technical solutions in one or more implementations of the present specification with reference to the accompanying drawings in the one or more implementations of the present specification. Apparently, the described implementations are merely some but not all of the implementations of the present specification. All other implementations obtained by a person of ordinary skill in the art based on the one or more implementations of the present specification without creative efforts shall fall within the protection scope of the implementations of the present specification.

Although the present specification provides a method operation step or an apparatus structure shown in the following implementations or the accompanying drawings, the method or apparatus can include more or fewer operation steps or module units based on conventional or non-creative efforts in the method or apparatus. In a step or structure that a necessary cause and effect relationship does not logically exist, a sequence of executing these steps or a module structure of the apparatus is not limited to an execution sequence or a module structure shown in the implementations or the accompanying drawings of the present specification. In an actual apparatus, server, or terminal product application, the method or the module structure can be performed sequentially or in parallel based on a method or a module structure shown in the implementations or the accompanying drawings (for example, a parallel processor or a multi-threaded processing environment, or even an implementation environment including distributed processing and server clustering).

A blockchain usually includes a plurality of blocks. The block is a logical data structure and can be used to store blockchain data. The blockchain data can include data information generated by operations such as funds flowing and changing in the blockchain, and funds flowing, asset changing, etc. In the blockchain, a flow of funds, or a change of assets can usually be referred to as a transaction. The assets in the blockchain described in some implementations of the present specification can include money, securities, and precious metals that are stored in the blockchain in a form of electronic data. For example, a wallet function provided by some applications can store monetary assets, and the assets in the wallet can be used for product purchasing or transferring.

The data in the blockchain can verify transaction validity through asymmetric encryption. The asymmetric encryption usually includes a public key and a private key; the public key can be made public, and the private key is not made public. The asymmetric encryption is one of the main tools for transaction verification in a blockchain asset transaction. A transaction party can sign a transaction by using a private key, and a verifier can verify the signature by using a public key of the transaction party. If the verification succeeds, it can indicate that the transaction is from a real owner of the private key corresponding to the public key, and the transaction is valid. The transaction can be placed in a new block of the blockchain. It can be seen from the previous process that the private key plays a very important role in the blockchain asset transaction. When assets are shared by a plurality of persons, the assets involve interests of the plurality of persons. When asset sharing parties need to jointly participate in an asset transaction, the one or more implementations of the present specification can effectively ensure operation security of shared assets in the blockchain.

Specifically, an implementation process of the present solution is described in the present specification by using a blockchain transaction of a wallet application as an implementation scenario. The wallet can include an application on a client or server side, and can usually generate an asymmetric key to calculate a public key address, so as to implement a blockchain asset transaction. When new assets are confirmed or an asset sharing party changes, the wallet can automatically calculate and generate child keys based on the number of asset sharing parties. The number of generated child keys is the same as the number of the asset sharing parties. These child keys can be sent to corresponding asset sharing parties, so that each asset sharing party owns one child key. When an original private key is needed for an asset transaction, the original private key can be restored by using these child keys, and a transaction is initiated by a signature using the restored private key.

Certainly, in the implementations of the present specification, the shared object is not necessarily limited to the previous electronic money assets, and the original key is not limited to a private key in the asymmetric encryption. The shared object can also include service data of a corresponding type in another implementation scenario, for example, billing data, user data, public information, etc. The original key can also include other data information for data encryption, for example, a character string, or even key data such as an image, a voice, and a fingerprint. In the following implementation, the process of generating the plurality of child keys based on the original key and restoring the original key by using the received child keys can also be completed by a miner in the blockchain through calculation. The miner is usually a node having enough computing capability. The miner can place a plurality of collected transaction records together, try various padding bits for encryption by using a key of the miner, and broadcast the block to the entire network, so that other nodes can learn that a new block is generated in the blockchain.

Specifically, an implementation is shown in FIG. 1. In an implementation of a key data processing method provided in the present specification, the method can include the following steps.

S0. Obtain an original key of a shared object in a blockchain, and determine the number of parties sharing the original key.

S2. Process the original key by using a predetermined algorithm, to generate the same number of child keys as that of parties sharing the original key, where the child keys are used to restore the original key when the same number of child keys are obtained.

In the present implementation, a calculation apparatus can obtain information about an original key corresponding to assets and information about the number of parties sharing the assets. Then, the original key can be calculated and processed by using the predetermined algorithm selected or designed in advance, to generate the same number of child keys as that of parties sharing the assets. A shared object described in an implementation scenario of the present implementation can include assets in a wallet. The original key can be generated by a local wallet (server), or can be a received original key sent by another wallet (server). In the present implementation, by using each of the plurality of child keys generated based on the original key, transaction verification cannot be independently performed, or verification cannot succeed. When all child keys generated based on the same original key are collected together, the original key can be restored. If a child key is absent or any child key is incorrect, the original key cannot be restored, or the restored original key is incorrect.

For example, in an application scenario of the present implementation, a blockchain network can include a plurality of nodes, and each node can have a public key and a private key. Assume that there is a wallet application in a node, the wallet is the shared object in the present implementation, and the private key of the wallet is the original key. The private key of the wallet can be named S, and the number of wallet sharing persons is 2. Two child keys: S1 and S2 can be generated based on the private key S using the algorithm selected or designed in advance. The child key S1 in the wallet cannot sign the transaction, or the signature cannot be successfully verified. Likewise, the child key S2 in the wallet cannot sign the transaction, or the signature cannot be successfully verified. However, an original private key S can be restored based on the child key S1 and the child key S2. To restore the original private key S, corresponding calculations can be performed. The calculation is based on the predetermined algorithm used to generate the child key, for example, a reverse algorithm opposite to the predetermined algorithm for generating the child key. Certainly, the calculation can be based on other algorithms such as interpolation and child key correlation. The original key can also be restored with reference to third-party auxiliary data.

Further, in another implementation of the method provided in the present specification, after the same number of child keys as that of asset sharing parties are generated, the child keys can be displayed to corresponding asset sharing parties, so that each asset sharing party can obtain its own child key. Then, the original key can be deleted. For example, the original private key can be completely deleted from the wallet (or a storage unit storing the original private key). As such, any asset sharing party having a child key does not store the original key, to further ensure key data security, and prevent an asset sharing party from using the private key for an asset transaction privately. Specifically, another implementation of the method in the present specification is shown in FIG. 2, and the method can further include the following steps:

S4. Send the child keys to corresponding object sharing parties.

S6. Delete the original key.

Figure 2:
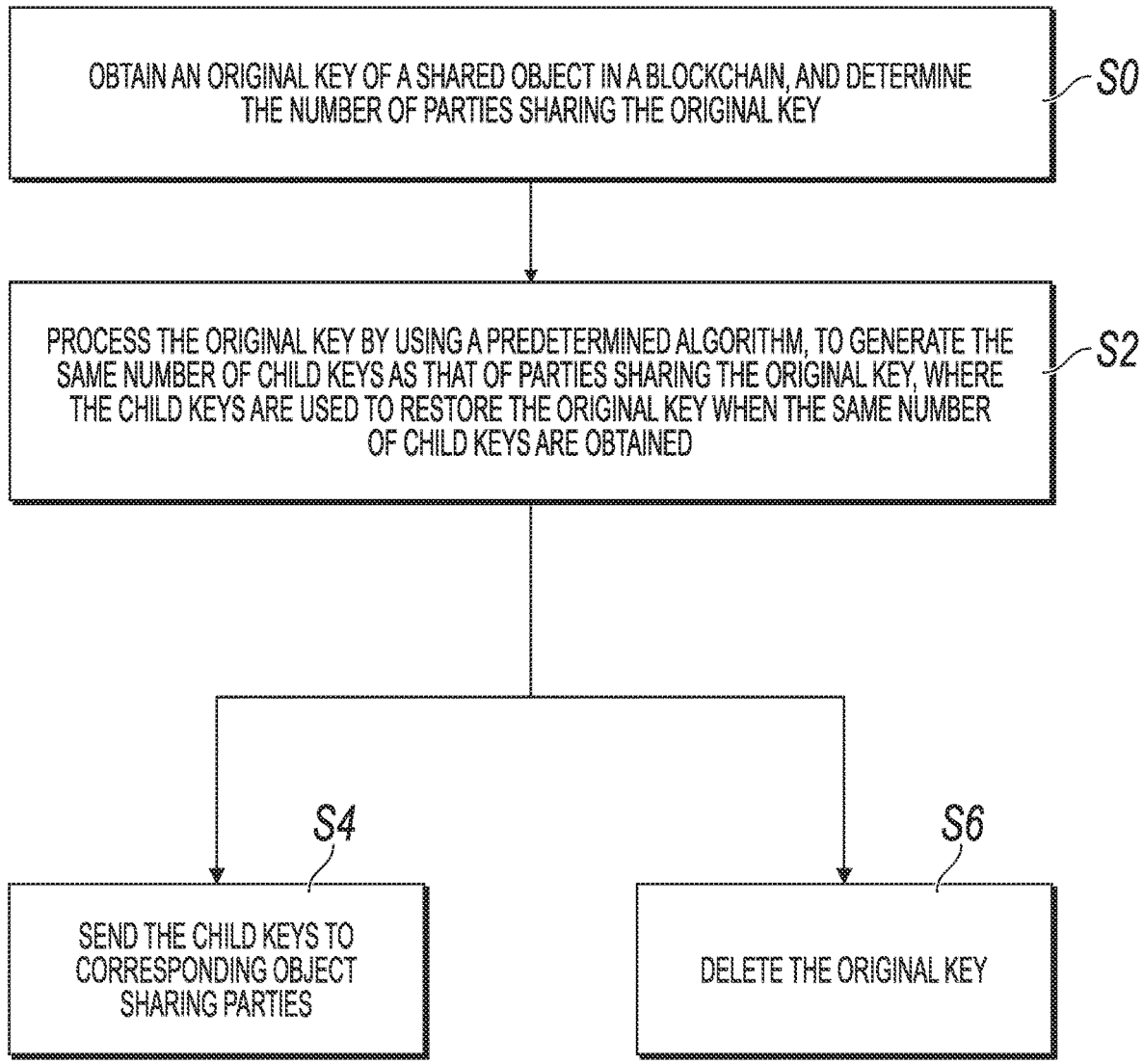
FIG. 2 is a flow diagram illustrating an example method, according to another implementation of the present specification.

FIG. 2 is a flow diagram illustrating an example method, according to another implementation of the present specification. In the present implementation, after generating the public key and the private key, the wallet can generate the same number of child keys as that of sharing persons based on the private key, display the child keys to the asset sharing parties, and delete the private key. In a specific implementation process, it can be set that one child key is sent to one asset sharing party. Certainly, this disclosure does not exclude situations where one asset sharing party has two or more child keys. For example, mutually trusted asset sharing parties can store each other's child keys.

In an implementation, the child key can be sent by the wallet to the object sharing party. In another implementation, after generating the child keys, the wallet outputs the plurality of generated child keys, and then another processing party (for example, a dedicated child key allocation apparatus) sends the child keys to the object sharing parties. A generated child key can be randomly selected and sent, or a specified child key can be selected based on a certain rule and sent to a corresponding object sharing party.

The predetermined algorithm for generating the child keys in the previous implementation can be implemented in a plurality of implementations. An implementation of the present specification provides a predetermined algorithm for generating a child key by using an original key. An operation can be performed with reference to the original key by using a random character string, to generate the child keys. Specifically, in an implementation of the method in the present specification, the predetermined algorithm can include the following step:

S20. Perform an operation on the original key by using a randomly generated character string, to generate the same number of child keys as that of parties sharing the original key.

The character string can include numerals, letters, symbols, etc. The wallet can store these randomly generated character strings for subsequent restoration of the original key. A specific method for the operation on the original key by using the randomly generated character string can be predetermined. For example, a character string of a fixed length is randomly generated, and one or more characters of the character string are separately inserted in the original key in a certain sequence to generate the child keys. The values of corresponding bits of the character string can also be added to the original key. In the present implementation, the child keys of the original key are generated by using the random character string, so as to further ensure security of the generated child keys, and improve security of the original key.

Figure 3:
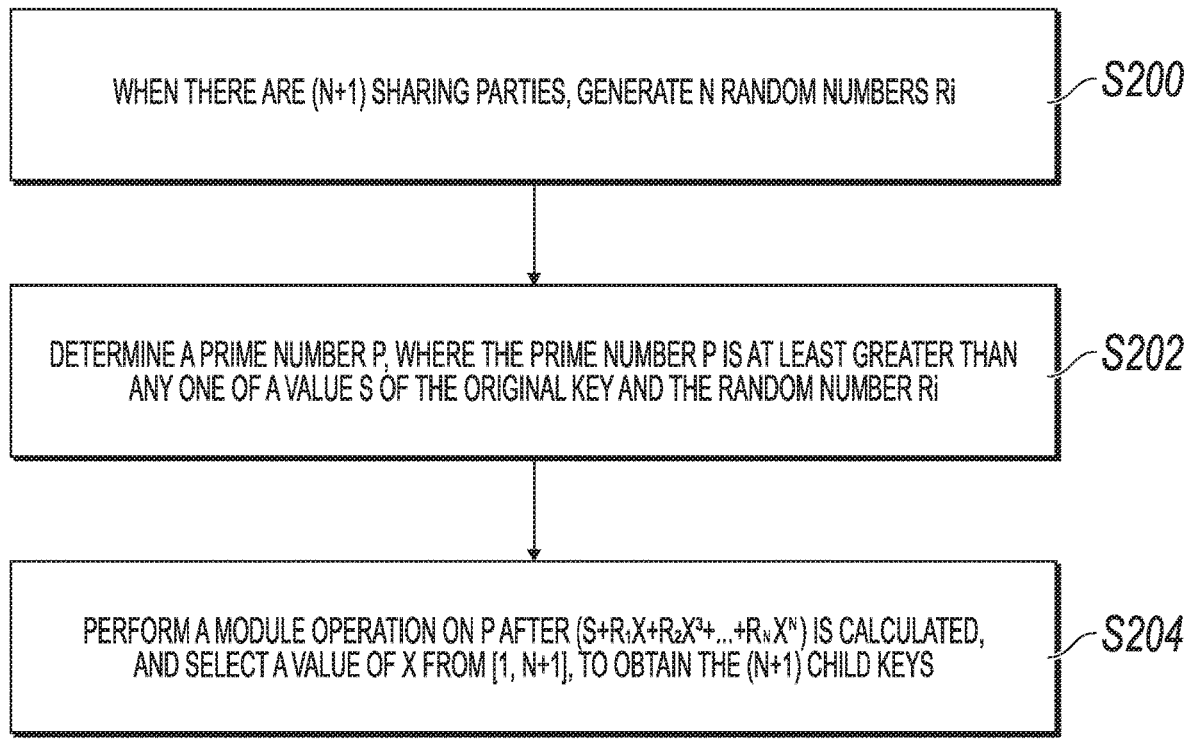
FIG. 3 is a flow diagram illustrating a process of generating a child key, according to an implementation of the present specification.

In another implementation of the method of the present specification, child keys are generated by using a random number, a prime number, and a modulo operation. Details are shown in FIG. 3. FIG. 3 is a flow diagram illustrating a process of generating the child keys, according to an implementation of the present specification. The predetermined algorithm can include the following steps:

S200. When there are (N+1) sharing parties, generate N random numbers Ri, where Ri is the $i^{th}$ random number, and $i \in [1, N]$.

S202. Determine a prime number P, where the prime number P is at least greater than any one of a value S of the original key and the random number Ri, and Ri ranges from [0, P−1].

S204. Perform a modulo operation on P after $(S+R_1X+R_2X^2+R_3X^3+ \ldots +R_NX^N)$ is calculated, and select a value of X from [1, N+1], to obtain the (N+1) child keys, where $N \geq 1$, and X and N are integers.

Generally, the length of the generated private key in the asymmetric key algorithm used in the blockchain is usually 1024 bits or 2048 bits. Therefore, in a specific implementation process of an implementation scenario, the wallet can pre-store some known prime numbers greater than 1024 bits or 2048 bits. In the present implementation, the pre-stored prime number can be used as data storage when the wallet generates the child keys. Assume that the private key is named S, the wallet can select the random number Ri based on the number of sharing persons. To meet a child key calculation condition, a prime number P that has length greater than a length of the private key S or the random number Ri can be selected. Further, a modulo operation can be performed on P by using $(S+R_1X+R_2X^2+R_3X^3+ \ldots +R_NX^N)$, to generate the child keys. A specific example can be shown as follows:

(1) If two persons share the assets, the generated child keys can be respectively: a child key 1: generated by performing a modulo operation on P by using (S+R); and a child key 2: generated by performing a modulo operation on P by using (S+2R).

(2) If three persons share the assets, the generated child keys can be respectively: a child key 1 generated by performing a modulo operation on P by using $(S+R_1+R_2)$; a child key 2 generated by performing a modulo operation on P by using $(S+2R_1+4R_2)$; and a child key 3 generated by performing a modulo operation on P by using $(S+3R_1+9R_2)$.

By analogy, if (N+1) persons share the assets, (N+1) child keys need to be generated, and a modulo operation can be performed on P by using $(S+R_1X+R_2X^2+R_3X^3+ \ldots +R_NX^N)$. The child keys can be obtained through calculation by selecting values of X from [1, N+1]. In another example, a process of generating four child keys by using the previous method when four persons share the assets can be as follows: a child key 1, generated by performing a modulo operation on P by using $(S+R_1+R_2+R_3)$; a child key 2, generated by performing a modulo operation on P by using $(S+2R_1+4R_2+8R_3)$; a child key 3, generated by performing a modulo operation on P by using $(S+3R_1+9R_2+27R_3)$; and a child key 4, generated by performing a modulo operation on P by using $(S+4R_1+16R_2+64R_3)$.

According to the predetermined algorithm for calculating the child keys provided in the present implementation, the same number of child keys as that of parties sharing the original key can be automatically generated based on the number of parties sharing the original key by using a predetermined method of combining the random number, the prime number, and the modulo operation. Because the child key generation method is used, the generated child keys are more confidential, a risk that the child keys are cracked is reduced, and the transaction is more secure.

In another implementation of the method provided in the present specification, the plurality of corresponding child keys can be generated based on the original key of the shared object, and the original key can further be restored based on the received child keys. Specifically, in another implementation of the method provided in the present specification, the method can further include the following steps:

S80. Receive entered child keys.

S82. When it is determined that the number of child keys is the same as the number of parties sharing the corresponding original key, restore, through calculation, the original key based on the child keys by using the predetermined algorithm, to obtain the corresponding original key.

Certainly, the method can further include the following step:

S84: Operate the shared object by using the original key that is obtained after the restoration through calculation.

Figure 4:
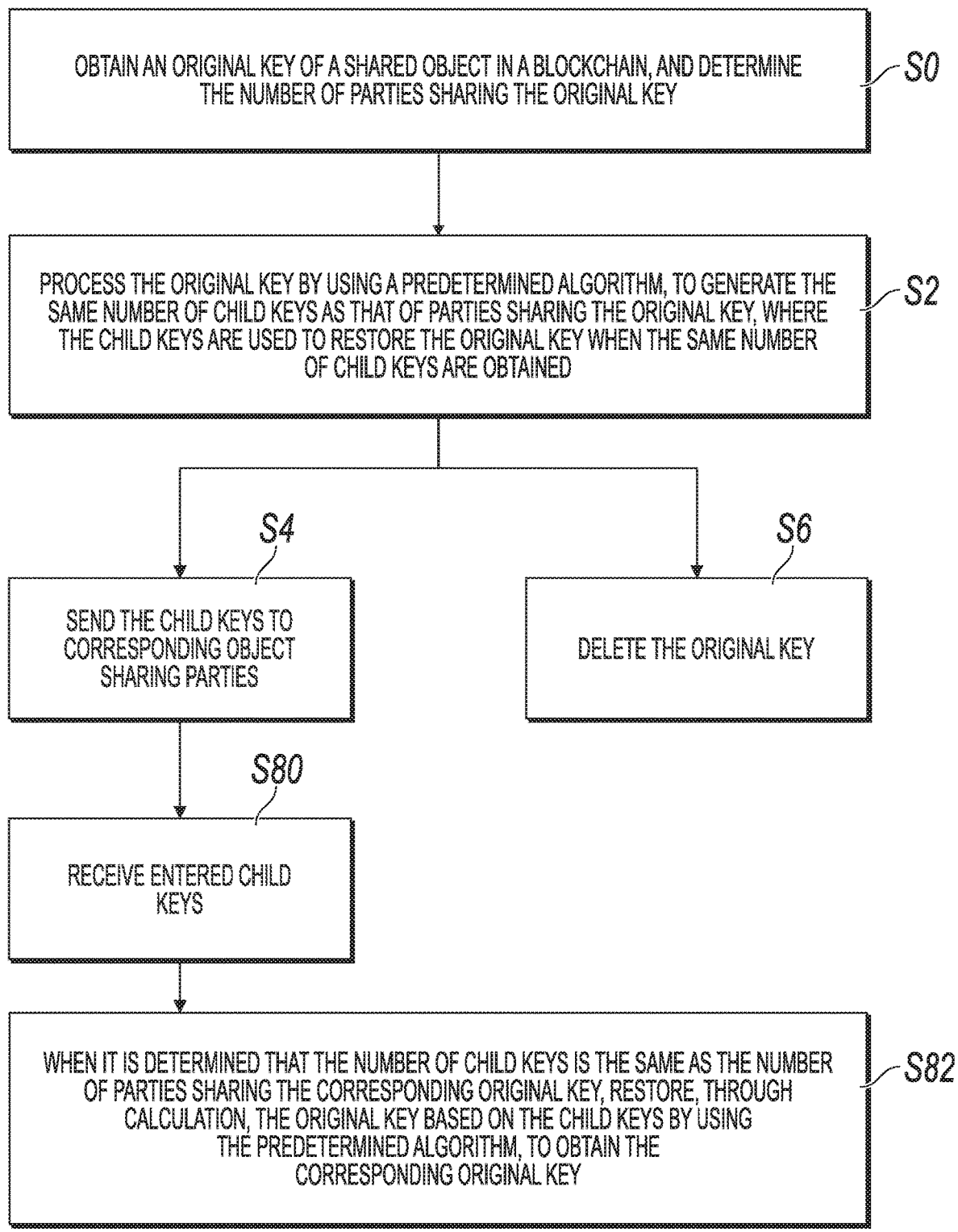
FIG. 4 is a flow diagram illustrating an example method, according to another implementation of the present specification.

FIG. 4 is a flow diagram illustrating an example method, according to another implementation of the present specification. When the original key is needed for an asset operation, each asset sharing party of the original key can enter its own child key. Because the child keys are distributed to the plurality of asset sharing parties, in the present implementation, the original key is restored when the same number of child keys as the number of parties sharing the original key are received. For example, the private key of the wallet generates three child keys that are respectively stored by three wallet sharing persons. When a wallet funds operation needs to be performed, each wallet sharing person enters its own child key. In the present situation, when receiving three child keys, the wallet can restore the private key of the wallet by using the three child keys. If the wallet receives only one or two child keys, or receives more than three child keys, it can indicate that the number of child keys is different from that of wallet sharing persons, and the original key cannot be restored.

The original key can be restored based on the child keys with reference to an algorithm corresponding to the algorithm for generating the child keys or with reference to characteristics of the child keys by using some specific methods. For example, in the implementation of generating the child keys by using the random number, the prime number, and the modulo operation, in one or more processes of restoring the original key in the present specification, the original private key S can be restored by using a Lagrange equation.

After the restored original key is obtained, a corresponding shared object can be operated by using the key. For example, a transaction can be signed to confirm that the transaction is generated by a user authorized by the wallet. Further, the wallet can broadcast information about the signed transaction to a blockchain network, and store the information in a new block.

The previous implementation provides the predetermined algorithm for generating the child keys by using the random character string or the random number, the prime number, etc. Another implementation of the present specification provides another implementation of generating a corresponding number of child keys based on the original key. In the present implementation, exclusive OR calculation can be performed on the original key and each of random numbers that are generated at any time, where the random numbers have the same length The value obtained after the exclusive OR calculation and these random numbers are used as the child keys. Specifically, in another implementation of the method provided in the present specification, the predetermined algorithm can include the following steps:

S210. Generate (N−1) random numbers, where binary lengths of the random numbers are the same as a binary length of the original key, and N is the number of parties sharing the original key.

S212. Perform a bitwise exclusive OR operation on the original key and each of the (N−1) random numbers, to obtain an exclusive OR child key.

S214. Use the exclusive OR child key and the (N−1) random numbers as N output child keys.

In the present implementation, if the shared object can generate the (N−1) random numbers in advance, the lengths of the random numbers can be the same as the length of the original key, for example, binary numbers of 1024 bits or 2048 bits. Exclusive OR calculation can be performed on the original key and each of the (N−1) random numbers, to obtain a value. The value and the previously generated (N−1) random numbers are used as the child keys, and one child key is allocated to each object sharing party.

Figure 5:
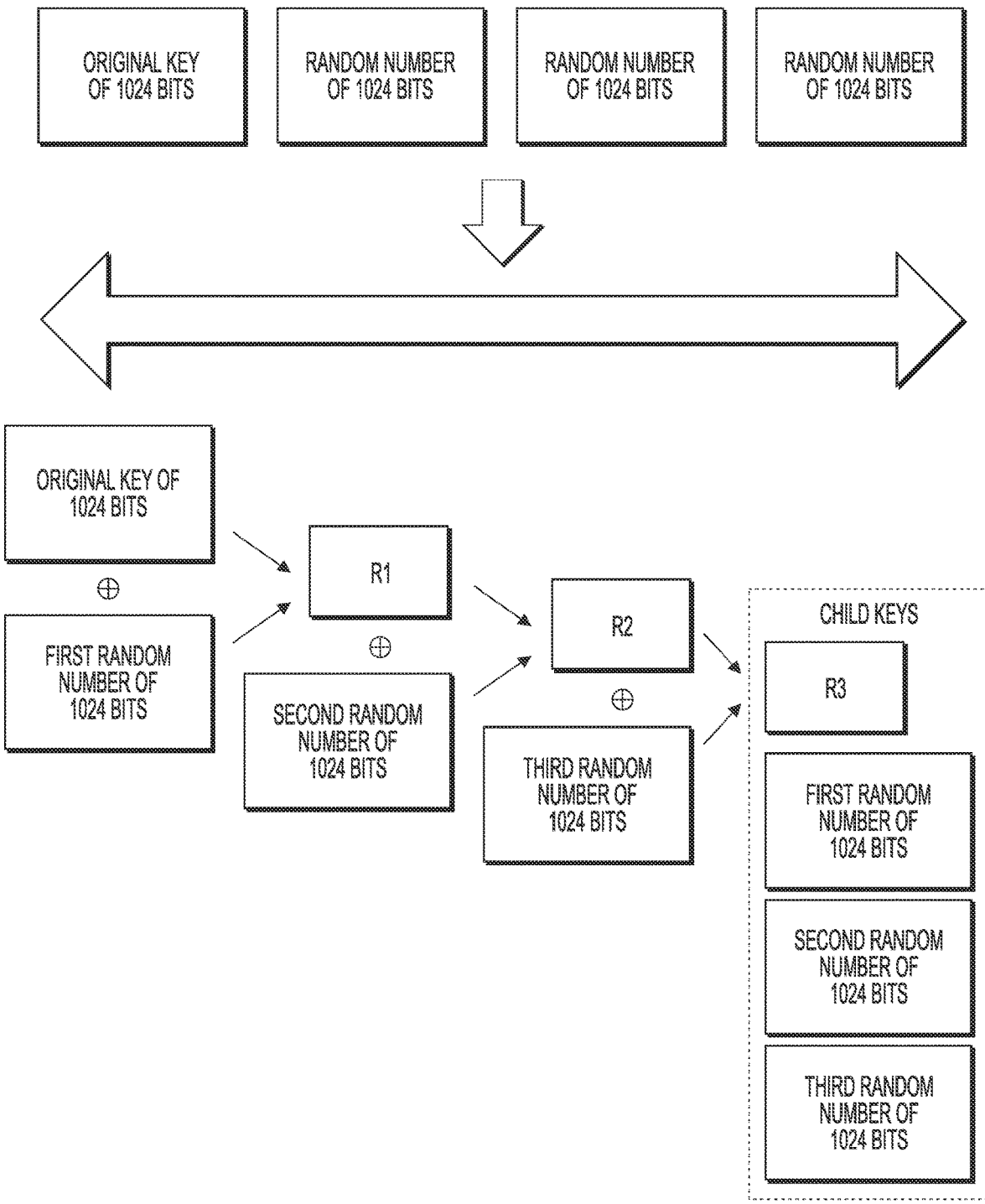
FIG. 5 is a schematic diagram illustrating another process of generating a child key based on a predetermined algorithm, according to the present specification.

A specific example of a processing method for performing a bitwise exclusive OR operation on the original key and each of the random numbers is shown in FIG. 5. FIG. 5 is a schematic diagram illustrating another process of generating the child keys based on a predetermined algorithm, according to the present specification. Assume that the length of the original key S is 1024 bits in a binary system, and the number of parties sharing the original key is 4. Accordingly, three random binary numbers of 1024 bits can be generated first. Then, an exclusive OR operation can be performed on the original key S and the first random number to obtain R1, and then an exclusive OR operation is performed on R1 and the second random number to obtain R2. Eventually, an exclusive OR operation is performed on R2 and the third random number to obtain R3, and R3 is the exclusive OR child key in the present implementation. R3 and the three random binary numbers of 1024 bits are used as the four child keys obtained through calculation. When the original key needs to be restored, a reverse exclusive OR operation can be performed on the child keys obtained by performing the exclusive OR operation in the present implementation. An exclusive OR operation is used during encryption, and an inverse operation of the exclusive OR operation is performed during decryption. As such, the original key can be obtained. The exclusive OR operation method provided in the present implementation is used to ensure that all correct child keys need to be collected during decryption, and the original key can be quickly obtained by performing an exclusive OR operation on the child keys. As such, the key is easier to restore, and a processing speed of restoring the original key during decryption is increased while ensuring asset transaction security.

The implementations in the present specification are described in a progressive way, for same or similar parts in the implementations, reference can be made to these implementations, and each implementation focuses on a difference from other implementations. For details, reference can be made to the descriptions in the previous related processing and related implementations. Details are not described here.

Specific implementations of the present specification are described above. Other implementations fall within the scope of the appended claims. In some situations, the actions or steps recorded in the claims can be performed in a sequence different from that in the implementations and a desired result can still be achieved. In addition, the process depicted in the accompanying drawings does not necessarily need a specific sequence or a consecutive sequence to achieve the desired result. In some implementations, multitask processing and parallel processing can be feasible or can be advantageous.

According to the key data processing method provided in the one or more implementations of the present specification, the original key can be split into the plurality of child keys based on the number of parties sharing the original key of the shared object such as assets or data, and the generated child keys can be displayed to the corresponding asset sharing parties. When the shared object needs to be operated, each asset sharing party can provide a child key. Then the original key can be restored by using the child keys, and corresponding operations such as signing and asset transactions can be performed. As such, in the present implementation of the present specification, when the assets in the blockchain are shared by a plurality of persons, any person can be effectively prevented from operating the assets in the absence of the other people's knowledge, to ensure security of a shared asset transaction in the blockchain.

Figure 6:
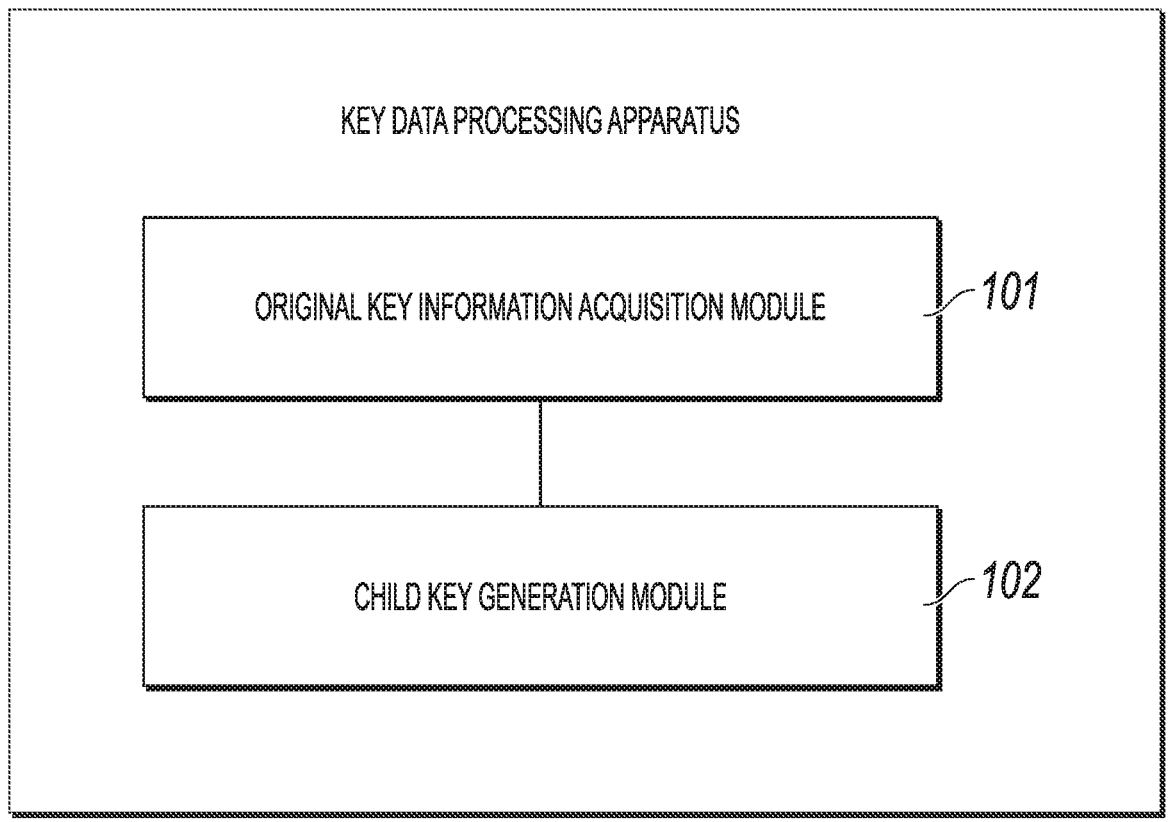
FIG. 6 is a schematic structural diagram illustrating a module of a key data processing apparatus, according to an implementation of the present specification.

Based on the previous user key data processing method, one or more implementations of the present specification further provide a key data processing apparatus. The apparatus can include an apparatus with necessary implementation hardware and using a system (including a distributed system), software (an application), a module, a component, a server, a client, etc. of the method in the implementations of the present specification. Based on a same innovative concept, the apparatus provided in the one or more implementations of the present specification is described in the following implementation. Because a problem-resolving implementation solution of the apparatus is similar to that of the method, for specific implementation of the apparatus in the implementations of the present specification, reference can be made to the implementation of the previous method. No repeated description is provided. A term "unit" or "module" used in the following implementations can implement a combination of software and/or hardware of a predetermined function. Although the apparatus described in the following implementations is preferably implemented by software, implementation of hardware or a combination of software and hardware is possible to conceive. Specifically, FIG. 6 is a schematic structural diagram illustrating a module of a key data processing apparatus, according to an implementation of the specification. As shown in FIG. 6, the apparatus can include an original key information acquisition module 101 and a child key generation module 102. The original key information acquisition module 101 is configured to obtain an original key of a shared object in a blockchain, and determine the number of parties sharing the original key. The child key generation module 102 is configured to process the original key by using a predetermined algorithm, to generate the same number of child keys as that of parties sharing the original key, where the child keys are used to restore the original key when the same number of child keys are obtained.

According to the key data processing apparatus provided in the present implementation, the original key can be split into a plurality of child keys based on the number of parties sharing the original key of the shared object such as assets or data. Each sharing person owns one child key, so that when assets are shared by a plurality of persons, an asset transaction needs joint participation of the plurality of persons. As such, an asset sharing person can be effectively prevented from operating transaction data privately in a blockchain, to ensure security of the asset transaction.

Figure 7:
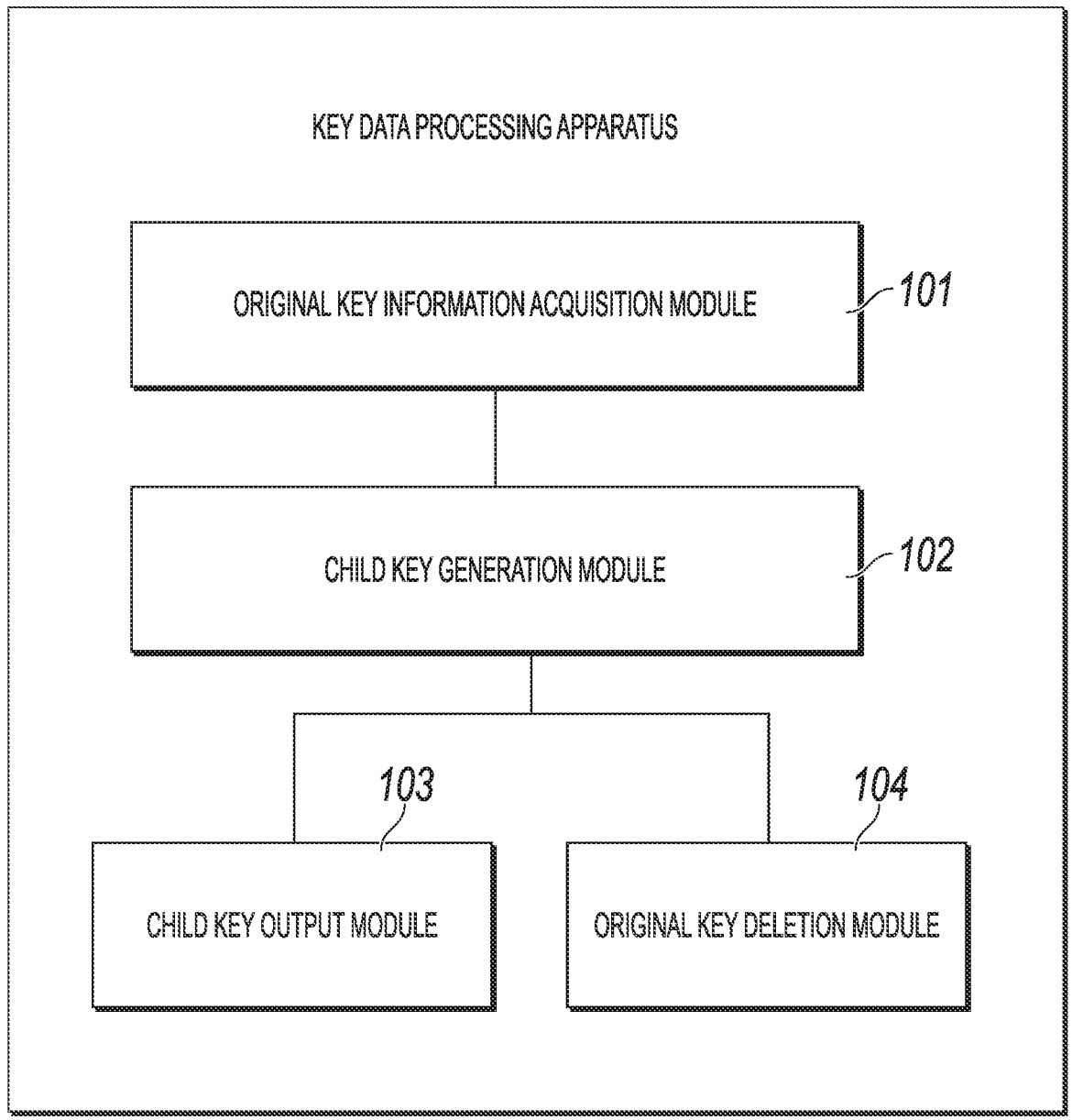
FIG. 7 is a schematic structural diagram illustrating a module of a key data processing apparatus, according to another implementation of the present specification.

FIG. 7 is a schematic structural diagram illustrating a module of a key data processing apparatus, according to another implementation of the present specification. In another implementation of the apparatus, the apparatus can further include: a child key output module 103, configured to send the child keys to corresponding object sharing parties; and an original key deletion module 104, configured to delete the original key.

In the present implementation, by using each of the plurality of child keys generated based on the original key, transaction verification cannot be independently performed, or verification cannot succeed. When all child keys generated by a same original key are collected together, the original key can be restored.

After the same number of child keys as that of asset sharing parties are generated, the child keys can be displayed to corresponding asset sharing parties, so that each asset sharing party can obtain a child key. Then, the original key can be deleted. For example, the original private key is completely deleted from a wallet. As such, any asset sharing party having a child key does not store the original key, to further ensure key data security, and prevent an asset sharing party from privately using the private key for an asset transaction.

In another implementation of the apparatus, the predetermined algorithm used in the child key generation module 102 can include: performing an operation on the original key by using a randomly generated character string, to generate the same number of child keys as that of parties sharing the original key.

Figure 8:
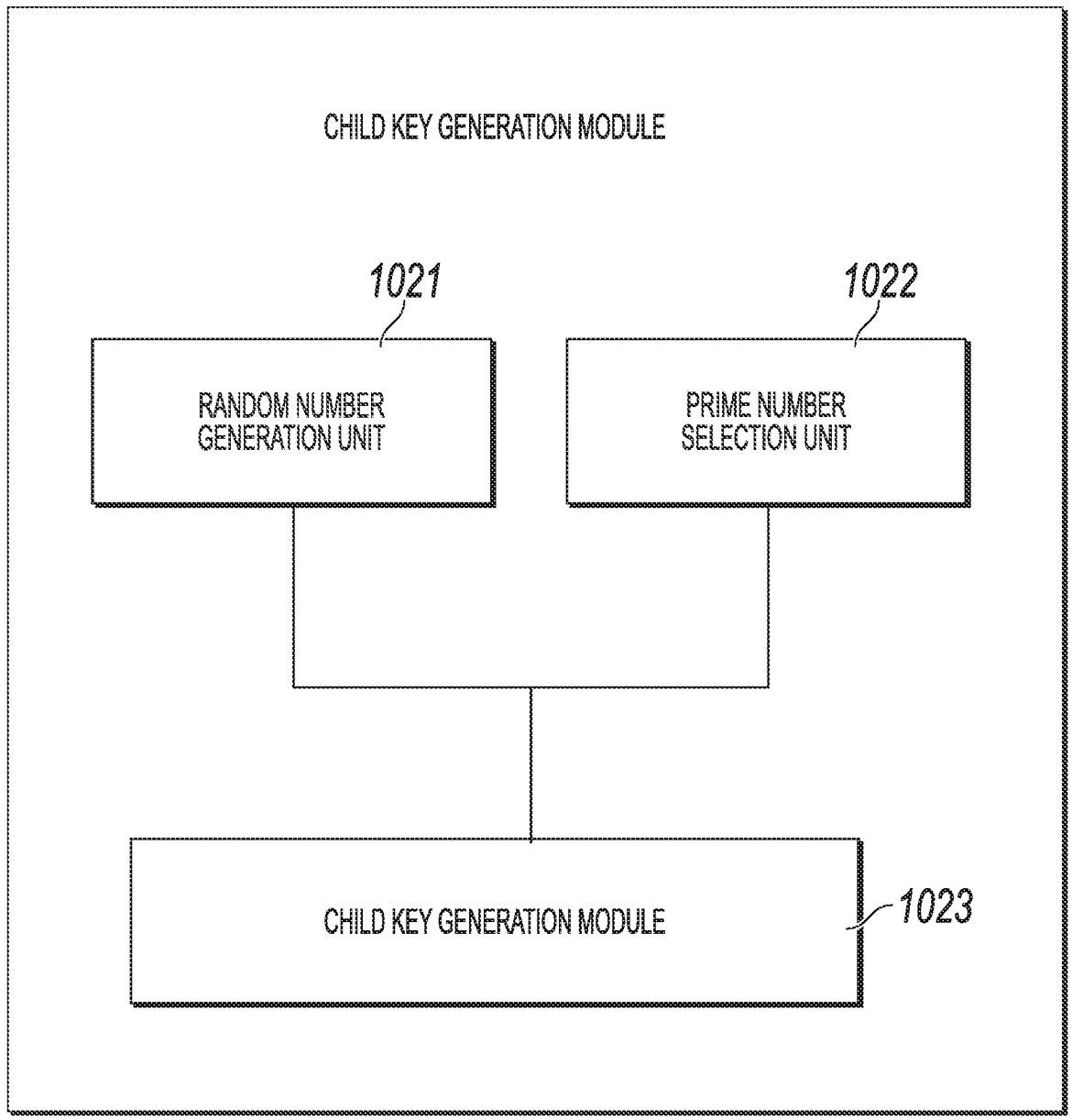
FIG. 8 is a schematic structural diagram illustrating a child key generation module in the apparatus, according to an implementation of the present specification.

Another implementation of the apparatus of the present specification provides an implementation of generating the child key by using a random number, a prime number, and a modulo operation. FIG. 8 is a schematic structural diagram illustrating a child key generation module in the apparatus, according to an implementation of the present specification. As shown in FIG. 8, the child key generation module 102 can include a random number generation unit 1021, a prime number selection unit 1022, and a child key calculation unit 1023. The random number generation unit 1021 is configured to: when there are (N+1) sharing parties, generate N random numbers Ri, where Ri is the $i^{th}$ random number, and $i \in [1, N]$. The prime number selection unit 1022 is configured to determine a prime number P, where the prime number P is at least greater than any one of a value S of the original key and the random number Ri, and Ri ranges from [0, P−1]. The child key calculation unit 1023 is configured to: perform a modulo operation on P after (S+R1X+R2X2+ R3X3+ . . . +RNXN) is calculated, and select a value of X from [1, N+1], to obtain the (N+1) child keys, where N≥1, and X and N are integers.

Based on the predetermined algorithm for calculating the child keys provided in the present implementation and the number of parties sharing the original key, the same number of child keys as that of parties sharing the original key can be automatically generated by using a predetermined method of combining the random number, the prime number, and the modulo operation. Because of the use of the above-mentioned child key generation method, the child keys can be more securely generated, the risk that the child keys are cracked is reduced, and the transaction is more secure.

Figure 9:
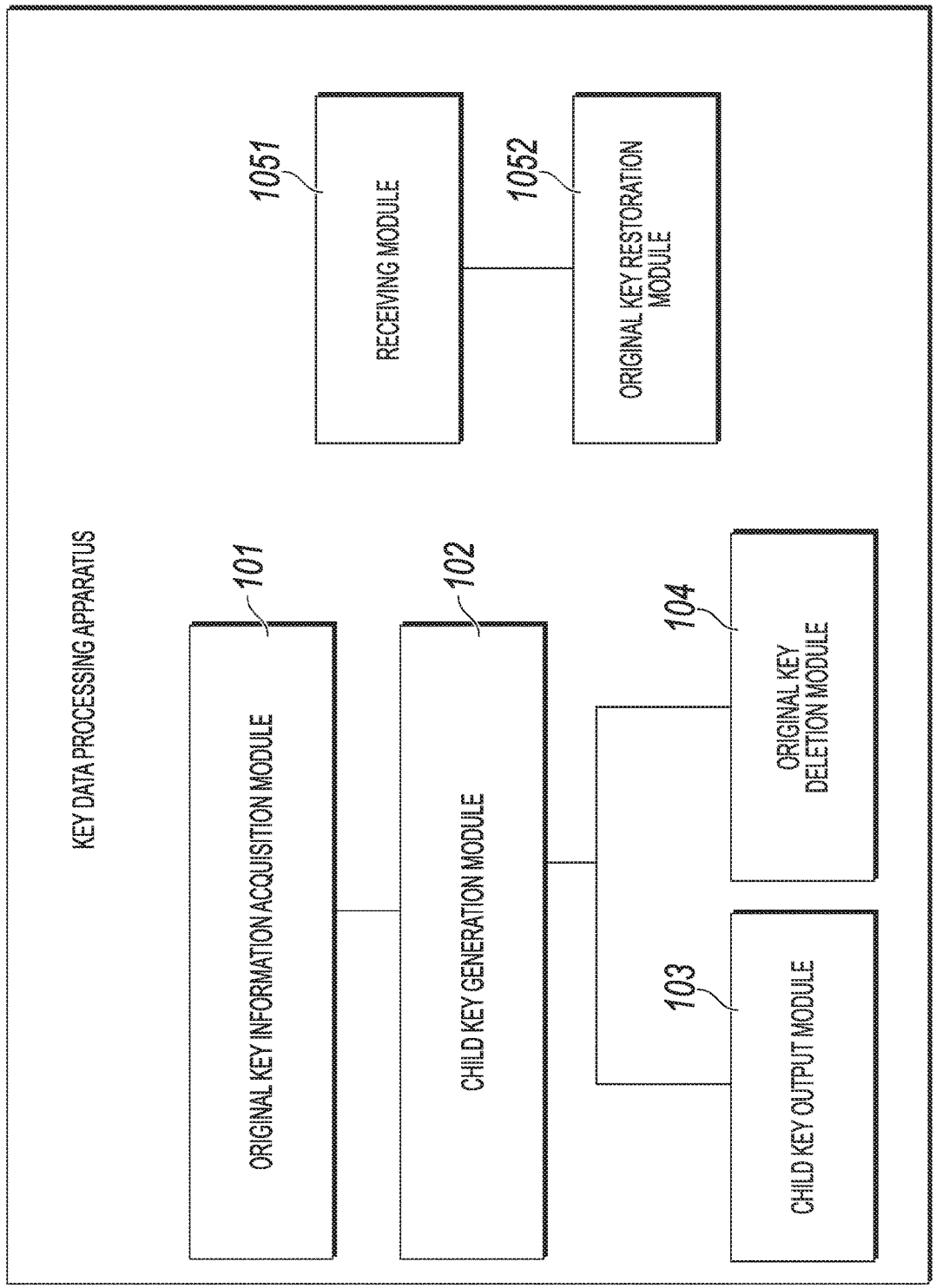
FIG. 9 is a schematic structural diagram illustrating a key data processing apparatus, according to another implementation of the present specification.

In another implementation of the apparatus provided in the present specification, the plurality of corresponding child keys can be generated based on the original key of the shared object, and the original key can further be restored based on the received child keys. FIG. 9 is a schematic structural diagram illustrating a key data processing apparatus, according to another implementation of the present specification. As shown in FIG. 9, the apparatus can further include a receiving module 1051 and an original key restoration module 1052. The receiving module 1051 is configured to receive entered child keys. The original key restoration module 1052 is configured to: when it is determined that the number of child keys is the same as the number of parties sharing the corresponding original key, restore, through calculation, the original key based on the child keys by using the predetermined algorithm, to obtain the corresponding original key.

Figure 10:
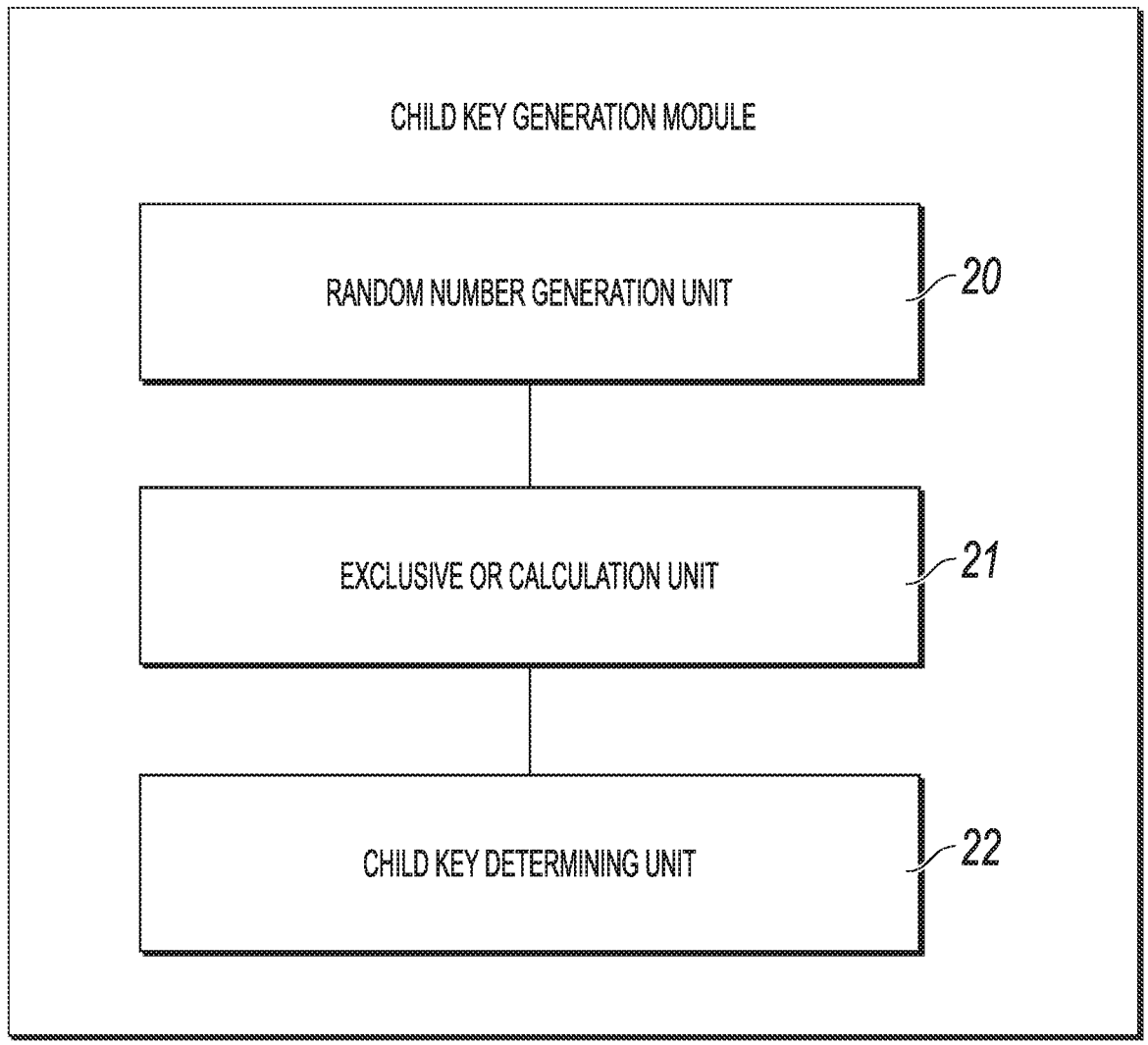
FIG. 10 is a schematic structural diagram illustrating a child key generation module in the apparatus, according to another implementation of the present specification.

FIG. 10 is a schematic structural diagram illustrating a child key generation module in the apparatus, according to another implementation of the present specification. As shown in FIG. 10, the child key generation module 102 can include a random number generation unit 20, an exclusive OR calculation unit 21, and a child key determining unit 22. The random number generation unit 20 is configured to generate (N−1) random numbers, where binary lengths of the random numbers are the same as a binary length of the original key, and N is the number of parties sharing the original key. The exclusive OR calculation unit 21 is configured to perform a bitwise exclusive OR operation on the original key and each of the (N−1) random numbers, to obtain an exclusive OR child key. The child key determining unit 22 is configured to use the exclusive OR child key and the (N−1) random numbers as N output child keys.

In the present implementation, exclusive OR calculation can be performed on the original key and each of random numbers of the same length generated at any time, to obtain a value, and then the value obtained after the exclusive OR calculation and these random numbers are used as child keys.

The exclusive OR operation method provided in the present implementation is used to ensure that all correct child keys need to be collected during decryption, and the original key can be quickly obtained by performing an exclusive OR operation on the child keys. As such, the key is easier to restore, and a processing speed of restoring the original key during decryption is greatly increased while ensuring asset transaction security.

It is worthwhile to note that the previous apparatus can further include another implementation based on the descriptions of the method implementation. For a specific implementation, reference can be made to the descriptions in the related method implementation, and details are not described here.

In the previous apparatus implementation, in an actual product application, each module or submodule can be combined or split based on an implementation environment or a data processing requirement. When the one or more implementations of the present specification are implemented, the functions of each module can be implemented in one or more pieces of software and/or hardware, or a module implementing a same function can be implemented by a combination of a plurality of submodules or subunits. The described apparatus implementation is merely an example. For example, the unit division is merely logical function division and can be other division in actual implementation. For example, a plurality of units or components can be combined or integrated into another system, or some features can be ignored or not performed.

Figure 11:
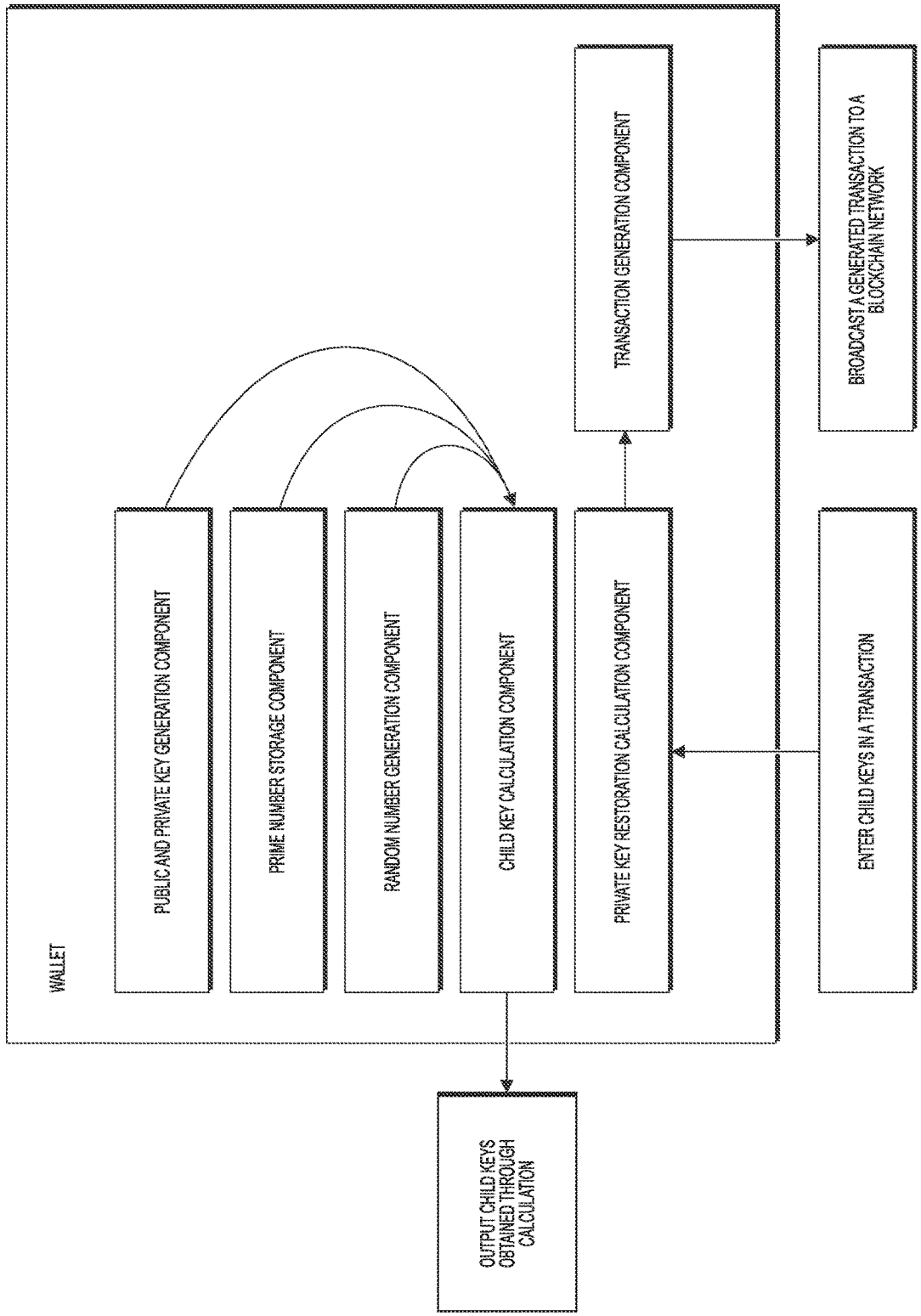
FIG. 11 is a schematic structural diagram illustrating a module using a wallet application, according to an implementation of the present specification.

FIG. 11 is a schematic structural diagram illustrating a module using a wallet application, according to an implementation of the present specification. As shown in FIG. 11, a public and private key generation component of the wallet can generate a public key and a private key of the wallet. A prime number storage component pre-stores a plurality of prime numbers whose lengths are greater than a length of the private key. A random number generation component can generate a corresponding number of random numbers when a child key needs to be generated. A child key calculation unit can generate a plurality of child keys corresponding to the private key, and output the child keys. The output child keys can be allocated to corresponding wallet sharing parties. When an asset transaction is performed on the wallet, each sharing party enters a child key, a private key restoration calculation component can calculate the original key based on a corresponding algorithm for restoring an original key, and perform signature, verification, etc. on the transaction by using the original key. After the transaction is generated, the transaction can be broadcast to the entire blockchain network.

According to the key data processing apparatus provided in the one or more implementations of the present specification, the original key can be split into a plurality of child keys based on the number of parties sharing the original key of the shared object such as assets or data, and the generated child keys can be displayed to the corresponding asset sharing parties. When the shared object needs to be operated, each asset sharing party can provide a child key. Then the original key can be restored by using the child keys, and corresponding operations such as signing and asset transactions can be performed. As such, in the present implementation of the present specification, when the assets in the blockchain are shared by the plurality of persons, any person can be effectively prevented from operating the assets in the absence of the other people's knowledge, so as to ensure security of a shared asset transaction in the blockchain.

The method or apparatus in the previous implementations of the present specification can implement service logic and record the service logic on a storage medium by using a computer program, and the storage medium can be read and executed by a computer, so as to implement the effects of the solutions described in the present implementations of the present specification. The storage medium can include a physical apparatus for storing information, which is generally digitized and then stored in media such as electric, magnetic, or optical. The storage medium can include an apparatus for storing information in an electric energy way, for example, a storage device such as a RAM or a ROM; an apparatus for storing information in a magnetic energy way such as a hard disk, a floppy disk, a magnetic tape, a magnetic core memory, a magnetic bubble memory, or a USB flash drive; and an apparatus for storing information in an optical way such as a CD or a DVD. Certainly, there is a readable storage medium of another form such as a quantum memory or a graphene memory.

The user key data processing method or apparatus provided in the implementations of the present specification can be implemented by a processor in a computer by executing a corresponding program instruction, for example, implemented on a server by using c++ Language in a Windows operating system, on a server based on a Linux system, or on a server system terminal by using Android, iOS system programming language, or implemented by using processing logic based on a quantum computer. The program instruction can be stored on the storage medium. In another implementation of the key data processing apparatus provided in the present specification, a processor and a memory configured to store an instruction that can be executed by the processor can be included, and when executing the instruction, the processor implements the following operations: obtaining an original key of a shared object in a blockchain, and determining the number of parties sharing the original key; and processing the original key by using a predetermined algorithm, to generate the same number of child keys as that of parties sharing the original key, where the child keys are used to restore the original key when the same number of child keys are obtained.

It is worthwhile to note that the previous apparatus can further include another implementation based on the description of the method implementation. For example, the processor deletes data of the original key, generates the child keys by using the random number, the prime number, and the modulo operation, restores the original key by using a Lagrange equation, generates the child keys by performing an exclusive OR operation, and restores the original key by performing an inverse operation. For a specific implementation, reference can be made to the descriptions of the related method implementations, and details are not described here.

Figure 12:
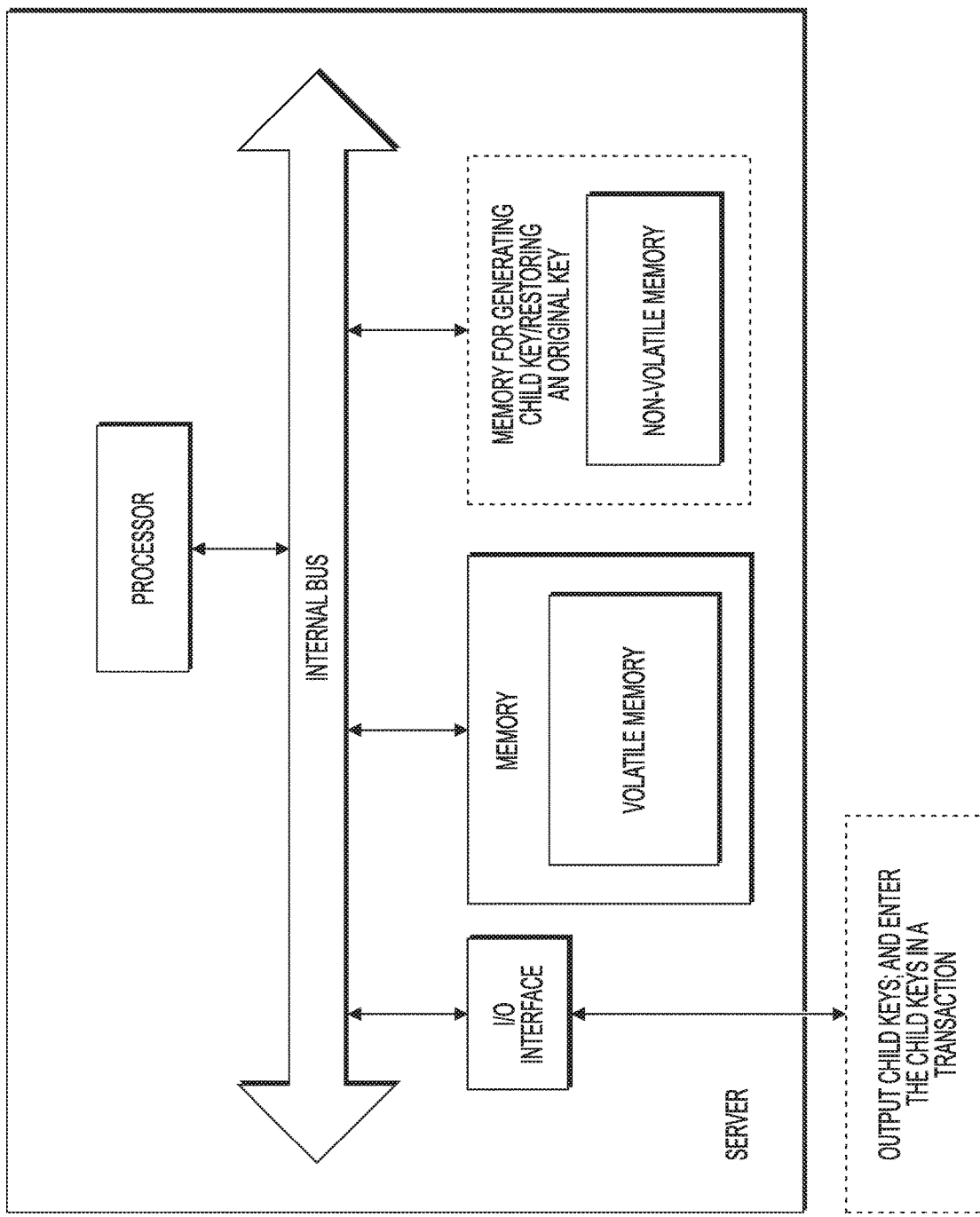
FIG. 12 is a schematic structural diagram illustrating a server for implementing a method or apparatus, according to an implementation of the present specification.

The previous method or apparatus can be used in a plurality of servers for key data processing, for example, a daemon server of the wallet, a server of a miner node in a blockchain, and a service server of a node in a blockchain. The server can include a separate server, or can include a server in a distributed system or an architectural pattern of a server cluster. Specifically, the present specification provides a server as shown in FIG. 12, the server can include at least one processor and a memory configured to store an instruction that can be executed by the processor. When executing the instruction, the processor implements the following operations: obtaining an original key of a shared object in a blockchain, and determining the number of parties sharing the original key; and processing the original key by using a predetermined algorithm, to generate the same number of child keys as that of parties sharing the original key. When the number of obtained child keys are the same as the number of the parties sharing the original key, the child keys can be used to restore the original key.

It is worthwhile to note that the previous server can further include another implementation based on the description of the method or apparatus implementation. For example, the processor deletes data of the original key, generates the child key by using the random number, the prime number, and the modulo operation, restores the original key by using a Lagrange formula, generates the child key by performing an exclusive OR operation, and restores the original key by performing an inverse operation. For a specific implementation, reference can be made to the descriptions of the related method or apparatus implementations, and details are not described here.

The implementations in the present specification are all described in a progressive way, for same or similar parts in the implementations, reference can be made to these implementations, and each implementation focuses on a difference from other implementations. Especially, a hardware and program implementation is basically similar to a method implementation, and therefore is described briefly; for related parts, reference can be made to partial descriptions in the method implementation.

Specific implementations of the present specification are described above. Other implementations fall within the scope of the appended claims. In some situations, the actions or steps recorded in the claims can be performed in a sequence different from that in the implementations and a desired result can still be achieved. In addition, the process depicted in the accompanying drawings does not necessarily need a specific sequence or a consecutive sequence to achieve the desired result. In some implementations, multi-task processing and parallel processing can be feasible or can be advantageous.

According to the key data processing method and apparatus, and the server provided in the one or more implementations of the present specification, the original key can be split into a plurality of child keys based on the number of parties sharing the original key of the shared object such as assets or data, and the generated child keys can be displayed to the corresponding asset sharing parties. When the shared object needs to be operated, each asset sharing party can provide a child key. Then the original key can be restored by using the child keys, and corresponding operations such as signing and asset transactions can be performed. As such, in the present implementation of the present specification, when the assets in the blockchain are shared by a plurality of persons, any person can be effectively prevented from operating the assets in the absence of the other people's knowledge, so as to ensure security of a shared asset transaction in the blockchain.

The content of the implementations of the present specification describes data generation, definition, acquisition, interaction, calculation, determining, etc., for example, generating a child key by using a random number, a prime number, and a modulo operation, generating a child key by using an exclusive OR operation, restoring an original key by using a Lagrange equation, and deleting an original private key after child key allocation. However, the implementations of the present specification are not limited to satisfying an industry communications standard, a blockchain data rule, standard computer data processing and a storage rule, or situations described in the one or more implementations of the present specification. A slightly modified implementation solution obtained by using some industry standards, or in a self-defined way, or on a basis of described implementations can also implement an implementation effect that is the same as, equivalent to, or similar to the described implementation, or an expected implementation effect obtained after transformation. The implementations of obtaining, storing, determining, processing, etc. modified or deformed data can still fall within the scope of the optional implementation solutions of the implementations of the present specification.

Specific implementations of the present specification are described above. Other implementations fall within the scope of the appended claims. In some situations, the actions or steps recorded in the claims can be performed in a sequence different from that in the implementations and a desired result can still be achieved. In addition, the process depicted in the accompanying drawings does not necessarily need a specific sequence or a consecutive sequence to achieve the desired result. In some implementations, multi-task processing and parallel processing can be feasible or can be advantageous.

In the 1990s, whether technology improvement is hardware improvement (for example, improvement of a circuit structure, such as a diode, a transistor, or a switch) or software improvement (improvement of a method procedure) can be obviously distinguished. However, as technologies develop, improvement of many current method procedures can be considered as direct improvement of a hardware circuit structure. A designer usually programs an improved method procedure to a hardware circuit to obtain a corresponding hardware circuit structure. Therefore, a hardware entity module can improve a method procedure.

For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. It is similar to a software compiler used to develop and compose a program. However, original code obtained before compilation is also written in a specific programming language, and it is referred to as hardware description language (HDL). However, there are various HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most popular. A person skilled in the art should also understand that, only logic programming needs to be performed on the method procedure by using the described several hardware description languages, and the several hardware description languages are programmed to an integrated circuit, so that a hardware circuit that implements the logical method procedure can be easily obtained.

A controller can be implemented in any appropriate way. The controller can use, for example, a microprocessor or a processor, and can store forms of a computer-readable medium, a logic gate, a switch, an application-specific integrated circuit (ASIC), a programmable logic controller, and an embedded microcontroller that are of computer-readable program code (for example, software or hardware) that can be executed by the (micro) processor. The controller includes but is not limited to the following microcontrollers: ARC 625D, Atmel AT91SAM, Microchip PIC18F26K20, or Silicone Labs C8051F320. A memory controller can also be implemented as a part of control logic of the memory. A person skilled in the art also knows that, in addition to implementing the controller in a pure computer-readable program code way, logic programming can be completely performed by using the method step, so that the controller implements a same function in a form of a logical gate, a switch, an application-specific integrated circuit, a programmable logic controller, an embedded microcontroller, etc. Therefore, the controller can be considered as a hardware component, and an apparatus for implementing various functions in the controller can also be considered as a structure in a hardware component. Alternatively, an apparatus configured to implement various functions can be considered as a software module or a structure in a hardware component that can implement the method.

The system, apparatus, module, or unit described in the described implementations can be specifically implemented by a computer chip or an entity, or implemented by a product with a function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

Although the one or more implementations of the present specification provide the operation steps of the method according to an implementation or a flowchart, the conventional or non-creative means can include more or fewer operation steps. The sequence of steps enumerated in the implementations is merely one of a plurality of step execution sequences, and does not represent a unique execution sequence. In actual execution of an apparatus or a terminal product, execution can be performed based on a method sequence shown in the implementations or the accompanying drawings, or performed in parallel (for example, a parallel processor or a multi-thread processing environment, or even a distributed data processing environment). Terms "include", "contain", or their any other variant is intended to cover non-exclusive inclusion, so that a process, a method, an article, or a device that includes a series of elements not only includes these very elements, but also includes other elements which are not expressly listed, or further includes elements inherent to such process, method, article, or device. An element preceded by "includes a . . . " does not, without more constraints, preclude the existence of additional identical elements in the process, method, article, or device that includes the element.

For ease of description, the described apparatus is described by dividing functions into various units. Certainly, when the one or more implementations of the present specification are implemented, the functions of each module can be implemented in one or more pieces of software and/or hardware, or a module implementing a same function can be implemented by a combination of a plurality of submodules or subunits. The described apparatus implementation is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art also knows that, in addition to implementing the controller in a pure computer-readable program code way, logic programming can be completely performed by using the method step, so that the controller implements a same function in a form of a logical gate, a switch, an application-specific integrated circuit, a programmable logic controller, an embedded microcontroller, etc. Therefore, the controller can be considered as a hardware component, and an apparatus for implementing various functions in the controller can also be considered as a structure in a hardware component. Alternatively, an apparatus configured to implement various functions can be considered as a software module or a structure in a hardware component that can implement the method.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions can be stored in a computer-readable memory that can instruct the computer or any other programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts or in one or more blocks in the block diagrams.

In typical configuration, the computing device includes one or more processors (CPU), an input/output interface, a network interface, and a memory.

The memory can include a form of a volatile memory, a random access memory (RAM) and/or a non-volatile memory, etc. in a computer-readable medium, such as a read-only memory (ROM) or a flash memory (flash RAM). The memory is an example of the computer-readable medium.

The computer-readable medium includes volatile and non-volatile, removable and non-removable media, and can store information by using any method or technology. The information can be a computer-readable instruction, a data structure, a program module, or other data. A computer storage medium includes but is not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by the computing device. As described in the present specification, the computer-readable medium does not include transitory media, for example, a modulated data signal and a carrier.

A person skilled in the art should understand that the one or more implementations of the present specification can be provided as a method, a system, or a computer program product. Therefore, the one or more implementations of the present specification can use a form of hardware only implementations, software only implementations, or implementations with a combination of software and hardware. In addition, the one or more implementations of the present specification can use a form of a computer program product that is implemented on one or more computer-usable storage media (including but not limited to a disk memory, a CD-ROM, an optical memory, etc.) that include computer-usable program code.

The one or more implementations of the present specification can be described in common contexts of computer executable instructions executed by a computer, such as a program module. Generally, the program module includes a routine, a program, an object, a component, a data structure, etc. executing a specific task or implementing a specific abstract data type. The one or more implementations of the present specification can also be practiced in distributed computing environments. In these distributed computing environments, tasks are executed by remote processing devices that are connected by using a communications network. In the distributed computing environments, the program module can be located in local and remote computer storage media that include storage devices.

The implementations in the present specification are all described in a progressive way, for same or similar parts in the implementations, reference can be made to these implementations, and each implementation focuses on a difference from other implementations. Especially, a system implementation is basically similar to a method implementation, and therefore is described briefly; for related parts, reference can be made to partial descriptions in the method implementation. In descriptions in the present specification, descriptions about such reference terms as "an implementation", "some implementations", "an example", "a specific example", and "some examples" mean that specific features, structures, materials, or characteristics described with reference to the implementations or examples are included in at least one implementation or example of the present specification. In the present specification, the previous example expressions of the terms are not necessarily with respect to a same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification, provided that they do not conflict with each other.

The previous descriptions are merely implementations of the one or more implementations of the present specification, and are not intended to limit the one or more implementations of the present specification. For a person skilled in the art, the one or more implementations of the present specification can have various modifications and changes. Any modifications, equivalent replacements, improvements, etc. made within the spirit and principle of the present application shall fall within the protection scope of the claims.

Figure 13:
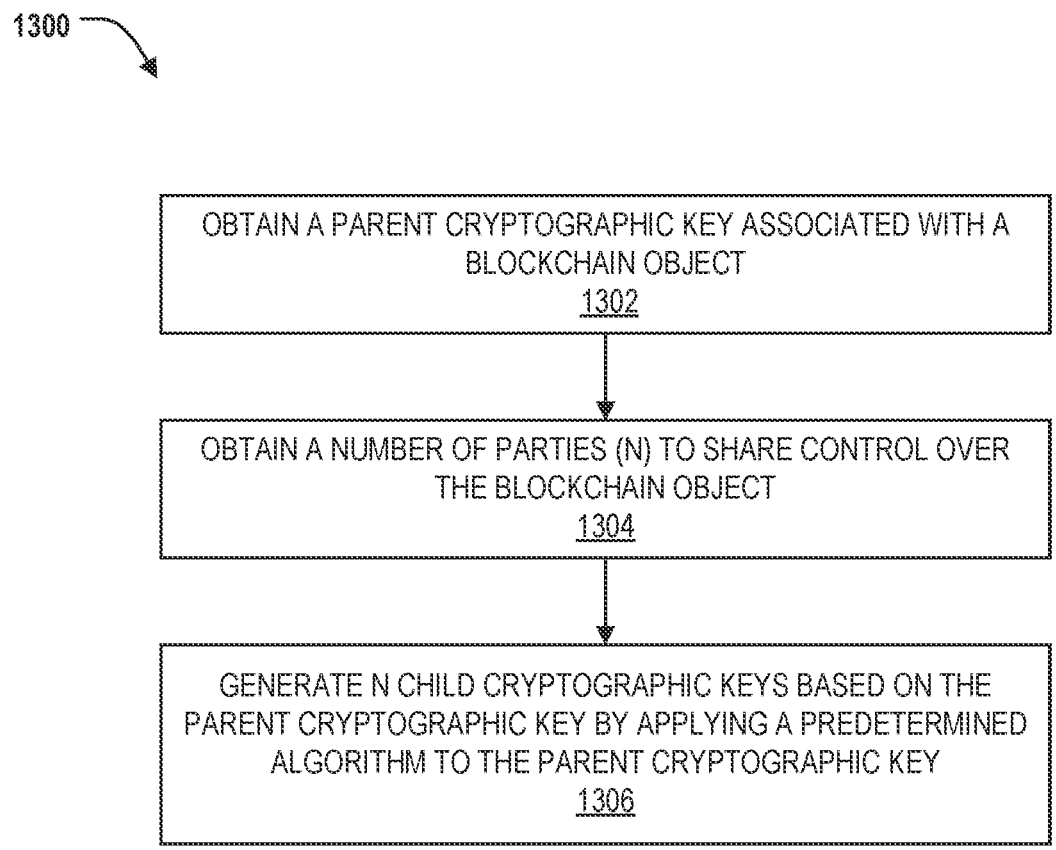
FIG. 13 is a flowchart illustrating an example of a computer-implemented method for managing shared ownership in a block chain network, according to an implementation of the present disclosure.

FIG. 13 is a flowchart illustrating an example of a computer-implemented method 1300 for managing shared ownership in a block chain network, according to an implementation of the present disclosure. For clarity of presentation, the description that follows generally describes method 1300 in the context of the other figures in this description. However, it will be understood that method 1300 can be performed, for example, by any system, environment, software, and hardware, or a combination of systems, environments, software, and hardware, as appropriate. In some implementations, various steps of method 1300 can be run in parallel, in combination, in loops, or in any order.

In a blockchain network, blockchain objects can represent various assets or data to be tracked by or recorded the blockchain. The ownership of a blockchain object is typically associated with a public-private key pair, and establishing that a party is in possession of the private key of the public-private key pair is used to show ownership of a blockchain object. For example, the owner of a blockchain object can encrypt a hash of a blockchain object using the private key, which other parties can decrypt using the public key associated with the blockchain object to confirm that the owner is in possession of the private key of the public-private key pair associated with the blockchain object, and hence the owner of the object.

In general, assets may be jointly owned by two or more parties. For example, a house, a car, or a bank account may be jointly owned by two or more parties. As such, an ability to jointly own a blockchain object is desired. However, a typical blockchain network allows only a single public-private key pair to be associated with a blockchain object, and modifying the blockchain network architecture to allow for association of multiple public-private key pair to an object may be infeasible. As such, there is a need for managing shared ownership of blockchain objects in existing blockchain networks. Such shared ownership may be implemented through generation of multiple child cryptographic keys from the private key (the "parent cryptographic key") of the public-private key pair associated with the blockchain object, and distribution of the child cryptographic keys to the joint owners of the object.

Individual child cryptographic keys are different from the parent cryptographic key, and therefore cannot be used to establish ownership of a blockchain object. However, when the joint owners each provide their child cryptographic key and when a complete set of child cryptographic keys are obtained, the parent cryptographic key can be reconstructed from the child cryptographic keys, which can in turn be used to prove joint ownership over the blockchain object and dispose the blockchain object as agreed upon by all of the joint owners. Accordingly, joint-control over the blockchain object is established, in which the blockchain object can be controlled only when all of the joint owners have provided their consent by providing their child cryptographic keys.

At 1302, a parent cryptographic key associated with a blockchain object is obtained. This step may be similar to the step S0 of FIG. 1. A blockchain object may be initially owned by a single owner at the time of creation of the object, as the blockchain object is associated with a single public-private key pair. When a group of parties wishes to jointly own the created blockchain object, or otherwise change ownership of the blockchain object from sole ownership to shared or joint ownership, the private key of the public-private key pair associated with the blockchain object is obtained. The private key may be obtained, for example, from the blockchain network at the time of creation of the blockchain object, or provided by the current owner of blockchain object. In some implementations, an intermediary, such as a broker or an agent, may obtain the parent cryptographic key on behalf of the interested parties to protect integrity of the ownership of the blockchain object until the child cryptographic keys are generated.

The private key of the public-private key pair is an example of the parent cryptographic key. The parent cryptographic key is typically a series of bits of predetermined length that depends, for example, on the specific encryption standard or technology. For example, the parent cryptographic key can have a bit-length of 128, 256, 384, 1024, 2048, 3072 bits, or longer.

From 1302, method 1300 proceeds to 1304.

At 1304, a number of parties (N) to share control over the blockchain object is obtained. N is an integer greater than or equal to 2. Prior to generating the child cryptographic keys, the number of keys to be generated is to be first obtained. For example, the parties establishing joint ownership may provide the number of parties N to the blockchain network, to the current owner of the blockchain object, or to an intermediary. This number of keys is typically the number of parties to share control over the blockchain. The parties sharing control over the blockchain may be joint or shared owners of the blockchain object. In some implementations, the parties sharing control can have capacities other than shared or joint owners of the blockchain object. For example, a party may be a trustee of an estate or a will, who may not own the blockchain object, but has control over how the blockchain object is disposed.

From 1304, method 1300 proceeds to 1306.

At 1306, N child cryptographic keys based on the parent cryptographic key are generated by applying a predetermined algorithm to the parent cryptographic key. The N child cryptographic keys are collectively operable to reconstruct the parent cryptographic key. This step may be similar to the step S2 of FIG. 1. Generally, the child cryptographic keys should meet two criteria. First, individual child cryptographic keys should be different from the parent cryptographic key, so that individual child keys cannot be used to establish ownership. Further, it would be advantageous for the generated child cryptographic keys to differ from the parent cryptographic keys in ways that do not substantially reduce the level of security of the parent cryptographic keys. Second, the complete set of child cryptographic keys should allow for deterministic reconstruction (e.g., not brute force) of the parent cryptographic key.

Once the parent cryptographic key and the number of parties N have been obtained, N child cryptographic keys can be generated from the parent cryptographic key in various ways. In some implementations, the N child cryptographic keys are generated by applying the predetermined algorithm to the parent cryptographic key that comprises: generating N−1 random numbers $R_i$, wherein i is an integer between 1 and N−1 and $R_i$ is a non-negative integer; determining a prime number P greater than the random numbers $R_i$, the prime number P being greater than at least one of a value S of the parent cryptographic key or the random numbers $R_i$, and greater than the random numbers $R_i$; and determining N child cryptographic keys Cx, wherein Cx=P modulo $(S+R_1X+R_2X^2+R_3X^3+\ldots+R_{N-1}X^{N-1})$ and X is an integer between 1 and N. The equation for determining the child cryptographic keys Cx may be rewritten in a mathematically equivalent form as $C_X = S + P \bmod \Sigma_{m=1}^{N-1} R_m X_m$.

In some implementations, the N child cryptographic keys are generated by applying the predetermined algorithm to the parent cryptographic key that comprises: generating N−1 random numbers having bit-lengths equal to a bit-length of the parent cryptographic key; and generating an exclusive OR (XOR) child cryptographic key by performing a series of bitwise XOR operations, that comprises: performing an XOR operation between the parent cryptographic key and one of the N−1 random numbers; and sequentially performing XOR operations between an output of previous XOR operation and one of the remaining random numbers. The N−1 random numbers and the XOR child cryptographic key generated by the XOR operations can be used as the N child cryptographic keys.

In some implementations, the N child cryptographic keys are generated by applying the predetermined algorithm to the parent cryptographic key that comprises: modifying the parent cryptographic key based on a randomly generated character string. This step may be similar to step S20 described previously. Portions of the randomly generated character string can be used to modify the parent cryptographic keys in different ways to generate different child cryptographic keys. For example, a specific portion of the parent cryptographic key can be replaced with a specific portion of the randomly generated character string to produce a child cryptographic key. Different portions of the parent cryptographic key can be replaced with different portions of the randomly generated character string to generate multiple child cryptographic keys. The locations and the lengths of the replaced portions in the parent cryptographic key and corresponding locations and lengths of the randomly generated character string may be determined according to a preset algorithm. The preset algorithm may vary the locations and lengths of the replaced portions in a random manner to improve robustness of the generated child cryptographic keys. The locations and lengths of the replaced portions may be shared among the parties holding the child cryptographic keys, for use during reconstruction of the parent cryptographic key from the child cryptographic keys. In some implementations, in addition to replacement of different portions of the parent cryptographic keys with portions of the randomly generated character string, the bit-string resulting from the replacement can further be scrambled according to a preset algorithm to further improve robustness.

After 1306, method 1300 stops.

In some implementations of the method 1300, the method further includes the steps of: transmitting the N child cryptographic keys to corresponding parties; and deleting the parent cryptographic key. By deleting the parent cryptographic key, any possibility of a single party obtaining the parent cryptographic key without reconstructing the parent cryptographic key from the complete set of child cryptographic keys is essentially eliminated, which improves the robustness of the shared ownership established through the child cryptographic keys. Further, in cases where an intermediary is involved in generation of the child cryptographic keys, deleting the parent cryptographic key in the intermediary's possession can prevent potential unauthorized control over the blockchain object by the intermediary. In some implementations, the method can further include the step of confirming that the transmitted child cryptographic keys have been received by the corresponding parties, and delete the parent cryptographic key when all parties have confirmed receipt of the child cryptographic keys.

Once the child cryptographic keys have been generated and transmitted to the parties, and once the parent cryptographic key has been deleted, the blockchain object associated with the parent cryptographic key cannot be controlled by any single party. When all of the shared or joint owners of the blockchain object agree to sell or otherwise control the blockchain object, the parent cryptographic key needs to be reconstructed. The parent cryptographic key can be reconstructed from the complete set of child cryptographic keys based on a reconstruction algorithm. As such, in some implementations of the method 1300, the method further includes the steps of: receiving a plurality of cryptographic keys; determining that a number of received plurality of cryptographic keys is equal to the number of parties sharing control over the blockchain object; and in response to determining that a number of received plurality of cryptographic keys is equal to the number of parties sharing control over the blockchain object, reconstructing the parent cryptographic key by applying a reconstruction algorithm to the received plurality of cryptographic keys. This step may be similar to step S82 of FIG. 4.

The reconstruction algorithm generally differs based on the predetermined algorithm for generating the child cryptographic keys. For example, the Lagrange's theorem or the Lagrange polynomial can be applied to child cryptographic keys generated using the modulo operation to reconstruct the parent cryptographic key. As another example, for child cryptographic keys generated using the XOR-based algorithm, the parent cryptographic key can be reconstructed using a series of XOR operations. Specifically, XOR operations can be performed between the XOR child cryptographic key and the random numbers in reverse order to reconstruct the parent cryptographic key. Due to the commutative and associative nature of XOR operation, the reconstruction may also be performed by performing a series of XOR operations between the XOR child cryptographic keys and the random numbers in any order. As such, in some implementations of the method 1300, the method further includes the steps of: receiving a plurality of cryptographic keys comprising the XOR child cryptographic key and the N−1 random numbers; determining that a number of received plurality of cryptographic keys is equal to the number of parties sharing control over the blockchain object; and in response to determining that a number of received plurality of cryptographic keys is equal to the number of parties sharing control over the blockchain object, reconstructing the parent cryptographic key by performing a series of bitwise XOR operations, comprising: performing an XOR operation between the XOR child cryptographic key and one of the N−1 random numbers; and sequentially performing XOR operations between an output of a previous XOR operation and one of the remaining random numbers.

The methods and apparatuses disclosed herein can improve blockchain networks by allowing shared or joint control over a blockchain object by several parties. Such joint control or ownership allows a blockchain network to support asset ownership paradigms in conventional ledgers and recordkeeping approaches. By generating child cryptographic keys from a single parent cryptographic key, and reconstructing the parent cryptographic key from the child cryptographic keys, shared ownership over blockchain objects can be established in existing blockchain networks without modifying the blockchain architecture. Further, by modifying the parent cryptographic key using modulo-based or XOR-based approaches to generate the child cryptographic keys, resulting child cryptographic keys do not contain significant portions of the parent cryptographic key. Such child cryptographic keys improve security of the shared or joint ownership relative to, for example, an approach where the parent cryptographic keys are simply divided into portions and handed out to the shared owners. Such division-based approach may be susceptible to brute force attempts by a majority, but not entirety, of the shared owners, as such group of shared owners possesses a large portion of the parent cryptographic key, which significantly reduces the computational burden associated with a brute force attempt, and compromises the shared control over the blockchain object.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, subprograms, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for processing key data comprising:
   obtaining, by a server, an original key associated with a shared blockchain object;
   determining a first number of parties sharing the original key, wherein the first number is at least 2; and
   generating, by the server, a plurality of child keys based on the original key by applying a predetermined algorithm to modify the original key using a randomly generated character string, wherein generating the plurality of child keys comprises:
      separately inserting one or more characters of the randomly generated character string in the original key in a predetermined sequence to produce the plurality of child keys, or
      replacing a different portion of the original key with a corresponding portion of the randomly generated character string to produce each of the plurality of child keys,
   wherein a total number of child keys equals the first number of parties sharing the original key, and
      wherein the plurality of child keys are collectively configured to enable reconstruction of the original key.

2. The computer-implemented method according to claim 1, wherein the method comprises:
   sending, by the server, each child key of the plurality of child keys to a different corresponding party of the first number of parties sharing the original key; and
   deleting, by the server, the original key.

3. The computer-implemented method according to claim 2 comprising restoring, by the server, the deleted original key based on the plurality of child keys.

4. The computer-implemented method according to claim 3, wherein restoring the deleted original key based on the plurality of child keys comprises using a reverse algorithm of the predetermined algorithm, an interpolation algorithm, a correlation among the plurality of child keys, or third-party auxiliary data.

5. The computer-implemented method according to claim 1, wherein the original key is generated by the server or is received from a remote server.

6. The computer-implemented method according to claim 1, wherein the randomly generated character string comprises one or more of: a numeral, a letter, and a symbol, and wherein the randomly generated character string is stored by the server for subsequent restoration of the original key.

7. The computer-implemented method according to claim 1, wherein the randomly generated character string comprises a fixed length.

8. The computer-implemented method according to claim 1, wherein location and length of the different portion of the original key and the corresponding portion of the randomly generated character string can be determined based on a preset algorithm.

9. A computer-implemented system, comprising:
   one or more computers; and
   one or more computer memory devices interoperably coupled with the one or more computers and having tangible, non-transitory, machine-readable media storing one or more instructions that, when executed by the one or more computers, perform operations comprising:

obtaining an original key associated with a shared blockchain object;

determining a first number of parties sharing the original key, wherein the first number is at least 2; and generating a plurality of child keys based on the original key by applying a predetermined algorithm to modify the original key using a randomly generated character string, wherein generating the plurality of child keys comprises separately inserting one or more characters of the randomly generated character string in the original key in a predetermined sequence to produce the plurality of child keys, or replacing a different portion of the original key with a corresponding portion of the randomly generated character string to produce each of the plurality of child keys, wherein a total number of child keys equals the first number of parties sharing the original key, and wherein the plurality of child keys are collectively configured to enable reconstruction of the original key.

10. The computer-implemented system according to claim 9, wherein the operations further comprise:

sending each child key of the plurality of child keys to a different corresponding party of the first number of parties sharing the original key; and deleting the original key.

11. The computer-implemented system according to claim 10, wherein the operations further comprises restoring the deleted original key based on the plurality of child keys.

12. The computer-implemented system according to claim 10, wherein restoring the deleted original key based on the plurality of child keys comprises using a reverse algorithm of the predetermined algorithm, an interpolation algorithm, a correlation among the plurality of child keys, or third-party auxiliary data.

13. The computer-implemented system according to claim 9, wherein the original key is received from a remote server.

14. The computer-implemented system according to claim 9, wherein the randomly generated character string comprises one or more of: a numeral, a letter, and a symbol, and wherein the randomly generated character string is stored for subsequent restoration of the original key.

15. A non-transitory, computer-readable medium storing one or more instructions executable by a computer system to perform operations comprising:

obtaining an original key associated with a shared blockchain object;

determining a first number of parties sharing the original key, wherein the first number is at least 2; and generating a plurality of child keys based on the original key by applying a predetermined algorithm to modify the original key using a randomly generated character string, wherein generating the plurality of child keys comprises separately inserting one or more characters of the randomly generated character string in the original key in a predetermined sequence to produce the plurality of child keys, or replacing a different portion of the original key with a corresponding portion of the randomly generated character string to produce each of the plurality of child keys, wherein a total number of child keys equals the first number of parties sharing the original key, and wherein the plurality of child keys are collectively configured to enable reconstruction of the original key.

* * * * *